United States Patent
Kolthammer et al.

(10) Patent No.: US 6,448,341 B1
(45) Date of Patent: Sep. 10, 2002

(54) ETHYLENE INTERPOLYMER BLEND COMPOSITIONS

(75) Inventors: Brian W. S. Kolthammer; Robert S. Cardwell, both of Lake Jackson; Ronald P. Markovich, Houston; Bharat I. Chaudhary, Pearland; Adam E. Laubach, Lake Jackson, all of TX (US); Jesus Nieto, Tarragona (ES)

(73) Assignee: The Dow Chemical Company, Midland, MI (US)

( * ) Notice: Subject to any disclaimer, the term of this patent is extended or adjusted under 35 U.S.C. 154(b) by 48 days.

(21) Appl. No.: 09/645,731

(22) Filed: Aug. 24, 2000

Related U.S. Application Data

(63) Continuation-in-part of application No. 09/121,689, filed on Jul. 23, 1998, now abandoned, which is a division of application No. 08/747,419, filed on Nov. 12, 1996, now Pat. No. 5,844,045, which is a continuation of application No. 08/010,958, filed on Jan. 29, 1993, now abandoned.

(51) Int. Cl.$^7$ ............................................. C08L 23/08
(52) U.S. Cl. .................. 525/240; 264/310; 264/331.17
(58) Field of Search ......................... 525/240; 264/310, 264/331.17

(56) References Cited

U.S. PATENT DOCUMENTS

| | | | |
|---|---|---|---|
| 3,645,992 A | 2/1972 | Elston et al. | 260/80 |
| 4,076,698 A | 2/1978 | Anderson | 526/348 |
| 4,374,227 A | 2/1983 | Michie et al. | 524/528 |
| 4,429,079 A | 1/1984 | Shibata et al. | 525/240 |
| 4,659,685 A | 4/1987 | Coleman, III et al. | 502/113 |
| 4,752,597 A | 6/1988 | Turner | 502/104 |
| 4,804,714 A | 2/1989 | Olivo et al. | 525/240 |
| 4,843,129 A | 6/1989 | Spenadel, et al. | 525/240 |
| 4,861,028 A | 8/1989 | Williams | 273/60 |
| 4,981,760 A | 1/1991 | Naito et al. | 428/523 |
| 5,008,204 A | 4/1991 | Stehling et al. | 436/85 |
| 5,082,902 A | 1/1992 | Gurevitch et al. | 525/240 |
| 5,189,106 A | 2/1993 | Morimoto et al. | 525/240 |
| 5,206,075 A | 4/1993 | Hodgson et al. | 428/216 |
| 5,272,236 A | 12/1993 | Lai et al. | 526/348 |
| 5,278,272 A | 1/1994 | Lai et al. | 526/348 |
| 5,350,807 A | 9/1994 | Pettijohn et al. | 525/240 |
| 5,376,439 A | 12/1994 | Hodgson et al. | 428/220 |
| 5,420,090 A | 5/1995 | Spencer et al. | 502/107 |
| 5,530,065 A | 6/1996 | Farley et al. | 525/240 |
| 5,844,045 A | * 12/1998 | Kolthammer et al. | 525/240 |

FOREIGN PATENT DOCUMENTS

| | | | |
|---|---|---|---|
| EP | 0 374 695 | 12/1989 | C08F/210/06 |
| EP | 0 436 328 | 12/1990 | C08F/4/606 |
| EP | 0 447 035 | 2/1991 | C08F/297/08 |
| EP | 0 662 989 | 10/1993 | C08F/23/04 |
| WO | 93/00400 | 7/1993 | C08L/23/04 |
| WO | 94/03538 | 2/1994 | C08L/23/16 |
| WO | 94/07930 | 4/1994 | C08L/299/00 |
| WO | 94/00500 | 6/1994 | C08L/23/06 |

OTHER PUBLICATIONS

Kissin, "Olefin Polymers", Kirk–Othmer Encyclopedia of Chemical Technology, 4$^{th}$ ed., vol. 17, John Wiley & Sons, New York, pp 756–757 (1996).*

Selman, SPO'92, "Future Trends in Polyolefins Technology", pp 11–16 (1992).*

"Molding Resins made from Blends of Polyolefins", *Research Disclosure 36210*, pp. 286–287, Jun. 1994.

"Advantages of Metallocene Ethylene Polymer Resins Blends in Cast Film", *Research Disclosure 37644*, pp. 556–557, Aug. 1995.

"Advantages of Metallocene Ethylene Polymer Resins Blends in Blown Cast Films", *Research Disclosure 37652*, pp. 565–573, Aug. 1995.

L. Wild, et al., "Determination of Branching Distributions in Polyethylene and Ethylene Copolymers", *Journal of Polymer Science*, vol. 20, pp. 441–445, 1982.

K. K Dohrer, et al., "Short Chain Branching Distribution of ULDPE", *Journal of Plastic Film and Sheeting*, vol. 4, pp. 214–226, 1988.

M. Tanaka, "High Value Added Film Using an Olefin Based Elastomer", *Speciality Plastics Conference*, Dec. 3–4, 1990.

* cited by examiner

*Primary Examiner*—D. R. Wilson

(57) ABSTRACT

Film, molded articles and fibers prepared from ethylene/α-olefin interpolymer compositions are disclosed. The interpolymer compositions are blends prepared by combining specified amounts of a narrow molecular weight distribution, narrow composition distribution breadth index interpolymer, and a broad molecular weight distribution, broad composition distribution breadth index interpolymer, with each blend component having a specified density, melt index and degree of branching.

8 Claims, 1 Drawing Sheet

ETHYLENE INTERPOLYMER BLEND COMPOSITIONS

CROSS-REFERENCE TO RELATED APPLICATIONS

This application is a continuation in part of application Ser. No. 09/121,689 filed Jul. 23, 1998, now abandoned which is a division of application Ser. No. 08/747,419 filed Nov. 12, 1996, now U.S. Pat. No. 5,844,045, which is a continuation of application Ser. No. 08/010,958 filed Jan. 29, 1993 now abandoned, all of which are incorporated herein by reference in their entirety. This application is related to pending application Ser. No. 07/776,130, filed Oct. 15, 1991, now U.S. Pat. No. 5,272,236, to pending application Ser. No. 07/815,716, filed Dec. 30, 1991, now abandoned, and to pending application Ser. No. 07/939,281, filed Sep. 2, 1992, now U.S. Pat. No. 5,278,272, the disclosures of all of which are incorporated herein by reference.

FIELD OF THE INVENTION

This invention relates to articles prepared from ethylene interpolymers made by an interpolymerization process. The processes utilize at least one homogeneous polymerization catalyst and at least one heterogeneous polymerization catalyst in separate reactors connected in series or in parallel. Interpolymers produced from such processes are thermoplastic and have surprisingly beneficial properties, including improved room and low temperature impact and tear properties, high modulus and higher crystallization temperatures, while maintaining equivalent or improved processability as compared to the individual blend components. The resins of the present invention are useful in making molded or shaped articles, film, and the like.

BACKGROUND OF THE INVENTION

There are known several polymerization processes for producing polyethylene and ethylene interpolymers, including suspension, gas-phase and solution processes. Of these, the solution process is of commercial significance due to the advantages described in U.S. Pat. No. 4,330,646 (Sakurai et al.), the disclosure of which is incorporated herein by reference. A most advantageous solution process would be found if the temperature of the polymerization solution could be increased and the properties of the polymers suitably controlled. U.S. Pat. No. 4,314,912 (Lowery et al.), the disclosure of which is incorporated herein by reference, describes a Ziegler-type catalyst suitable for use in high temperature solution polymerization processes. U.S. Pat. No. 4,612,300 (Coleman, III), the disclosure of which is incorporated herein by reference, and U.S. Pat. No. 4,330,646 describe a catalyst and solution polymerization process for producing polyethylenes having a narrow molecular weight distribution. U.S. Pat. No. 4,330,646 also describes a process for producing polyethylenes with a broader molecular weight distribution in a solution process. These processes are based on heterogeneous Ziegler type catalysts, which produce interpolymers with broad composition distributions regardless of their molecular weight distribution. Such ethylene polymers have deficiencies in some properties, for instance, poor transparency and poor antiblocking properties.

Solution polymerization processes for producing ethylene interpolymers with narrow composition distributions are also known. U.S. Pat. No. 4,668,752 (Tominari et al.), the disclosure of which is incorporated herein by reference, describes the production of heterogeneous ethylene copolymers with characteristics which include a narrower composition distribution than conventional heterogeneous copolymers. The utility of such polymer compositions in improving mechanical, optical and other important properties of formed or molded objects is also described. The complex structures of the copolymers necessary to achieve such advantages are finely and difficultly controlled by nuances of catalyst composition and preparation; any drift in which would cause a significant loss in the desired properties. U.S. Pat No. 3,645,992 (Elston), the disclosure of which is incorporated herein by reference, describes the preparation of homogeneous polymers and interpolymers of ethylene in a solution process operated at temperatures of less than 100° C. These polymers exhibit a "narrow composition distribution", a term defined by a comonomer distribution that, within a given polymer molecule, and between substantially all molecules of the copolymer, is the same. The advantages of such copolymers in improving optical and mechanical properties of objects formed from them is described. These copolymers, however, have relatively low melting points and poor thermal resistance.

U.S. Pat. No. 4,701,432 (Welborn, Jr.), the disclosure of which is incorporated herein by reference, describes a catalyst composition for the production of ethylene polymers having a varied range of composition distributions and/or molecular weight distributions. Such compositions contain a metallocene and a non-metallocene transition metal compound supported catalyst and an aluminoxane. U.S. Pat. No. 4,659,685 (Coleman, III et al.), the disclosure of which is incorporated herein by reference, describes catalysts which are composed of two supported catalysts (one a metallocene complex supported catalyst and the second a non-metallocene transition metal compound supported catalyst) and an aluminoxane. The disadvantages of such catalysts in the commercial manufacture of ethylene polymers are primarily twofold. Although, the choice of the metallocene and a non-metallocene transition metal compounds and their ratio would lead to polymers of controlled molecular structure, the broad range of ethylene polymer structures required to meet all the commercial demands of this polymer family would require a plethora of catalyst compositions and formulations. In particular, the catalyst compositions containing aluminoxanes (which are generally required in high amounts with respect to the transition metal) are unsuitable for higher temperature solution processes as such amount of the aluminum compounds result in low catalyst efficiencies and yield ethylene polymers with low molecular weights and broad molecular weight distributions.

Thus, it would be desirable to provide an economical solution process, which would provide ethylene interpolymers with controlled composition and molecular weight distributions. It would be additionally desirable to provide a process for preparing such interpolymers with reduced complexity and greater flexibility in producing a full range of interpolymer compositions in a controllable fashion.

Useful articles which could be made from such interpolymer compositions include films (e.g., cast film, blown film or extrusion coated types of film), fibers (e.g., staple fibers, melt blown fibers or spunbonded fibers (using, e.g., systems as disclosed in U.S. Pat. No. 4,340,563, U.S. Pat. No. 4,663,220, U.S. Pat. No. 4,668,566, or U.S. Pat. No. 4,322,027, all of which are incorporated herein by reference), and gel spun fibers (e.g., the system disclosed in U.S. Pat. No. 4,413,110, incorporated herein by reference)), both woven and nonwoven fabrics (e.g., spunlaced fabrics disclosed in U.S. Pat. No. 3,485,706, incorporated herein by reference) or structures made from such fibers (including, e.g., blends of these fibers with other fibers, e.g., PET or cotton)), and molded articles (e.g., blow molded articles, injection molded articles and rotational molded articles).

Rotational molding (also known as rotomolding), is used to manufacture hollow objects from thermoplastics. In the basic process of rotational molding, pulverized polymer is placed in a mold. While the mold is being rotated, the mold is heated and then cooled. The mold can be rotated uniaxially or biaxially and is usually rotated biaxially, i.e., rotated about two perpendicular axes simultaneously. The mold is typically heated externally and then cooled while being rotated. As such. rotomolding is a zero shear process and involves the tumbling, heating and melting of thermoplastic powder, followed by coalescence, fusion or sintering and cooling. In this manner, articles may be obtained which are complicated, large in size, and uniform in wall thickness.

Many compositions have been employed in rotational molding. For example, U.S. Pat. No. 4,857,257 teaches rotational molding compositions comprising polyethylene, peroxide cross-linker, and a metal cationic compound while U.S. Pat. No. 4,587,318 teaches crosslinked compositions comprising ethylene terpolymer and organic peroxide.

Research disclosure, RD-362010-A describes blends of traditionally catalyzed polyolefins, especially very low or ultralow density polyethylenes with densities of 0.89 to 0.915 g/cm3 with polyolefins made using single-site, metallocene catalysts. These blends are especially suited to rotational molding providing good control over the balance of processability and improved environmental stress crack resisitance (ESCR) and tear properties.

In the case of rotational molding, the final density and melt index of the compositions is typically a compromise between processability and end-product properties. Conventional knowledge teaches that increasing polymer density (or modulus) results in decreasing impact, and increasing melt index (or decreasing molecular weight) results in increased processability and corresponding decreases in ESCR and impact. Furthermore, increased branching has been known to result in inferior processability. As a result, one typically must choose which property to increase with the expectation that the other property must be decreased.

Thus it would be highly desirable to prepare molding compositions with improved processability (even when the zero or low shear viscosity or branching is increased) and improved room and low temperature impact and tear properties, improved optical properties, high modulus and higher thermal stability's, without necessarily decreasing the polymer density. Such improvements would be advantageous in a wide range of applications, including but not limited to molding and especially rotational molding., films, fibers and foams.

SUMMARY OF THE INVENTION

We have now discovered fabricated articles prepared by a polymerization processes for preparing interpolymer compositions of controlled composition and molecular weight distributions. The processes utilize at least one homogeneous polymerization catalyst and at least one heterogeneous polymerization catalyst in separate reactors connected in series or in parallel.

The First Process comprises the steps of:
1. A process for preparing an ethylene/α-olefin interpolymer composition, comprising the steps of:
    (A) reacting by contacting ethylene and at least one other α-olefin under solution polymerization conditions in the presence of a homogeneous catalyst composition containing either no aluminum cocatalyst or only a small amount of aluminum cocatalyst in at least one reactor to produce a solution of a first interpolymer which has a narrow composition distribution and a narrow molecular weight distribution,
    (B) reacting by contacting ethylene and at least one other α-olefin under solution polymerization conditions and at a higher polymerization reaction temperature than used in step (A) in the presence of a heterogeneous Ziegler catalyst in at least one other reactor to produce a solution of a second interpolymer which has a broad composition distribution and a broad molecular weight distribution, and
    (C) combining the solution of the first interpolymer with the solution of the second interpolymer to form a high temperature polymer solution comprising the ethylene/α-olefin interpolymer composition, and
    (D) removing the solvent from the polymer solution of step (C) and recovering the ethylene/α-olefin interpolymer composition.

These polymerizations are generally carried out under solution conditions to facilitate the intimate mixing of the two polymer-containing streams. The homogeneous catalyst is chosen from those metallocene-type catalysts, which are capable of producing ethylene/α-olefin interpolymers of sufficiently high molecular weight under solution process polymerization conditions (e.g., temperatures greater than or equal to about 100° C.). The heterogeneous catalyst is also chosen from those catalysts, which are capable of efficiently producing the polymers under high temperature (e.g., temperatures greater than or equal to about 180° C.) solution process conditions.

In addition, there is provided a second process for preparing interpolymer compositions of controlled composition and controlled molecular weight distributions.

The Second Process comprises the steps of:
A process for preparing an ethylene/α-olefin interpolymer composition, comprising the steps of:
    (A) polymerizing ethylene and at least one other α-olefin in a solution process under suitable solution polymerization temperatures and pressures in at least one reactor containing a homogeneous catalyst composition containing either no aluminum cocatalyst or only a small amount of aluminum cocatalyst to produce a first interpolymer solution comprising a first interpolymer having has a narrow composition distribution and a narrow molecular weight distribution, and
    (B) sequentially passing the interpolymer solution of (A) into at least one other reactor containing a heterogeneous Ziegler catalyst, ethylene and at least one other α-olefin under solution polymerization conditions and at a polymerization temperature higher than that used in (A), to form a high temperature polymer solution comprising the ethylene/α-olefin interpolymer composition, and
    (C) removing the solvent from the polymer solution of step (B) and recovering the ethylene/α-olefin interpolymer composition.

In either process, the homogeneous catalyst composition preferably exhibits a high reactivity ratio and very readily incorporates higher α-olefins.

The homogeneous catalysts employed in the production of the homogeneous ethylene interpolymer are desirably derived from monocyclopentadienyl complexes of the Group IV transition metals, which contain a pendant bridging group, attached to the cyclopentadienyl ring which acts as a bident ligand. Complex derivatives of titanium in the +3 or +4 oxidation state are preferred.

In another aspect of this invention, there are provided novel interpolymers of ethylene and at least one α-olefin, wherein the interpolymers have controlled composition and molecular weight distributions. The interpolymers have improved mechanical, thermal and optical properties and, surprisingly, the polymer compositions obtained by the processes described herein provide superior properties to materials obtained by merely blending the solid polymers obtained from process step (A) or (B) individually, in the First Process listed above.

The novel polymer compositions of the present invention can be ethylene or $C_3$–$C_{20}$ α-olefin homopolymers, preferably propylene or, more preferably, interpolymers of ethylene with at least one $C_3$–$C_{20}$ α-olefin and/or $C_4$–$C_{18}$ diolefins. Interpolymers of ethylene and 1-octene are especially preferred. The term "interpolymer" is used herein to indicate a copolymer, or a terpolymer, or the like. That is, at least one other comonomer is polymerized with ethylene to make the interpolymer.

In another aspect of the invention, thermoplastic compositions have been discovered which are especially suitable for rotational and injection molding and have improved physical and/or mechanical properties. In many cases, processability is also improved during rotational molding, as reflected in, for example, shorter cycle times, faster sintering, and/or the ability to fabricate articles over wide ranges of processing temperatures. For injection molding, the compositions may also exhibit shorter cycle times due to decreased set up times.

Advantageously, the compositions often exhibit one or more of the following: improved low temperature and/or room temperature impact, improved environmental stress crack resistance, and acceptable flexural and secant modulus, increased upper service temperature.

The compositions of the present invention with improved impact properties can also be utilized in other fabrication processes including, but not limited to blow molding, calendaring, pulltrusion, cast film, and blown film.

DETAILED DESCRIPTION OF THE INVENTION

Figure 1:
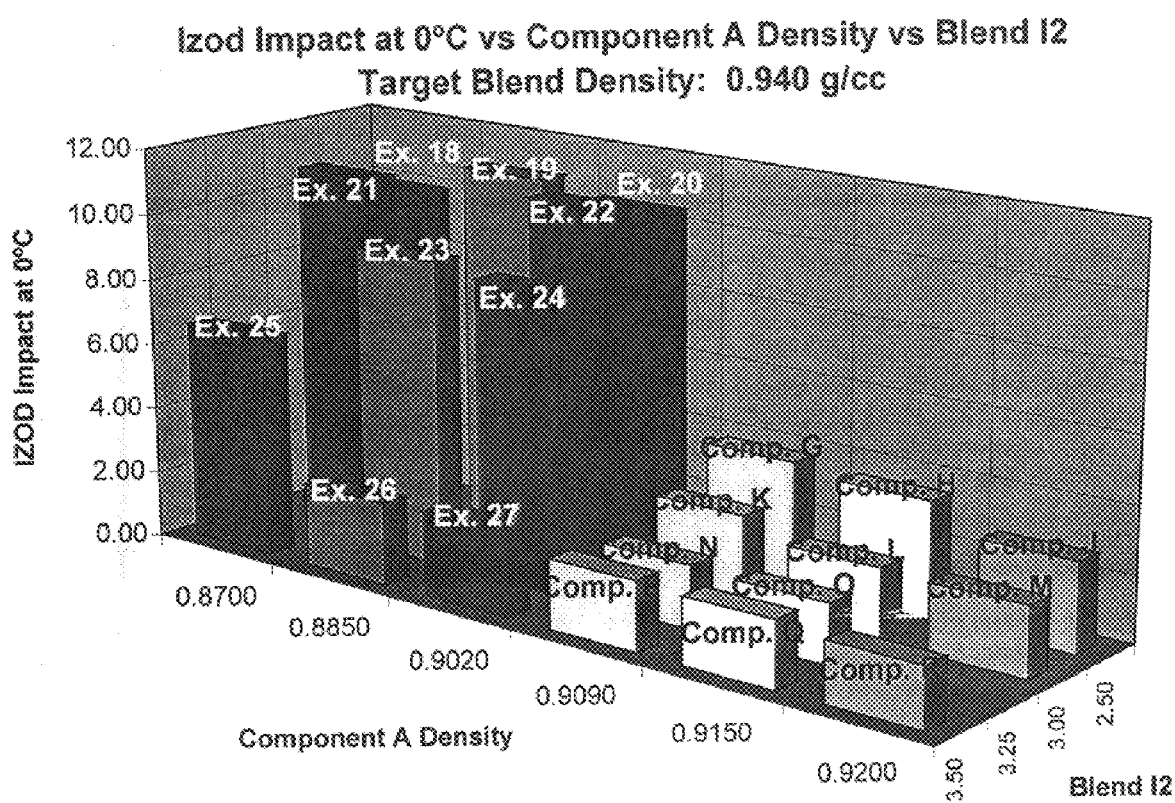
FIG. 1 illustrates the step change increase in Izod Impact (in this case measured at 0° C.) when the density of the homogeneous interpolymer blend component (Component 1) is below 0.909 g/cm³.

All references herein to elements or metals belonging to a certain Group refer to the Periodic Table of the Elements published and copyrighted by CRC Press, Inc., 1989. Also any reference to the Group or Groups shall be to the Group or Groups as reflected in this Periodic Table of the Elements using the IUPAC system for numbering groups.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

The term "hydrocarbyl" as employed herein means any aliphatic, cycloaliphatic, aromatic, aryl substituted aliphatic, aryl substituted cycloaliphatic, aliphatic substituted aromatic, or aliphatic substituted cycloaliphatic groups.

The term "hydrocarbyloxy" means a hydrocarbyl group having an oxygen linkage between it and the carbon atom to which it is attached.

The term "interpolymer" is used herein to indicate a polymer wherein at least two different monomers are polymerized to make the interpolymer. This includes copolymers, terpolymers, etc.

As used herein, "Izod impact strength" was measured according to ASTM test D-256 conducted at a particular temperature, "2% secant modulus" for films was measured according to ASTM test D-790, "flexural modulus" was measured according to ASTM test D-790, "heat distortion temperature" was measured according to ASTM test D-648 (at 66 psi), "low shear viscosity" was measured at 0.1 s$^{-1}$ shear rate using a dynamic mechanical spectrometer. "melt index" was measured according to ASTM test D-1238 (190° C., 2.16 kg load), "density" was measured according to ASTM D-792, and "Environmental Stress Crack Resistance" (ESCR-F50) was measured according to ASTM D-1524 using 10% Igepal solution.

The homogeneous polymers and interpolymers used in the present invention are herein defined as defined in U.S. Pat. No. 3,645,992 (Elston), the disclosure of which is incorporated herein by reference. Accordingly, homogeneous polymers and interpolymers are those in which the comonomer is randomly distributed within a given interpolymer molecule and wherein substantially all of the interpolymer molecules have the same ethylene/comonomer ratio within that interpolymer, whereas heterogeneous interpolymers are those in which the interpolymer molecules do not have the same ethylene/comonomer ratio.

The term "narrow composition distribution" used herein describes the comonomer distribution for homogeneous interpolymers and means that the homogeneous interpolymers have only a single melting peak and essentially lack a measurable "linear" polymer fraction. The narrow composition distribution homogeneous interpolymers can also be characterized by their SCBDI (Short Chain Branch Distribution Index) or CDBI (Composition Distribution Branch Index). The SCBDI or CDBI is defined as the weight percent of the polymer molecules having a comonomer content within 50 percent of the median total molar comonomer content. The CDBI of a polymer is readily calculated from data obtained from techniques known in the art, such as, for example, temperature rising elution fractionation (abbreviated herein as "TREF") as described, for example, in Wild et al, *Journal of Polymer Science, Poly. Phys. Ed.*, Vol. 20, p. 441 (1982), or in U.S. Pat. No. 4,798,081, and U.S. Pat. No. 5,008,204 and WO 93/04486, the disclosures of all of which are incorporated herein by reference. The SCBDI or CDBI for the narrow composition distribution homogeneous interpolymers and copolymers of the present invention is preferably greater than about 30 percent, especially greater than about 50 percent. The narrow composition distribution homogeneous interpolymers and copolymers used in this invention essentially lack a measurable "high density" (i.e., "linear" or homopolymer) fraction as measured by the TREF technique. The homogeneous interpolymers and polymers have a degree of branching less than or equal to 2 methyls/1000 carbons in about 15 percent (by weight) or less, preferably less than about 10 percent (by. weight), and especially less than about 5 percent (by weight).

The term "broad composition distribution" used herein describes the comonomer distribution for heterogeneous interpolymers and means that the heterogeneous interpolymers have a "linear" fraction and that the heterogeneous interpolymers have multiple melting peaks (i.e., exhibit at least two distinct melting peaks). The heterogeneous interpolymers and polymers have a degree of branching less than or equal to 2 methyls/1000 carbons in about 10 percent (by weight) or more, preferably more than about 15 percent (by weight), and especially more than about 20 percent (by weight). The heterogeneous interpolymers also have a degree of branching equal to or greater than 25 methyls/1000 carbons in about 25 percent or less (by weight), preferably less than about 15 percent (by weight), and especially less than about 10 percent (by weight).

The homogeneous polymers and interpolymers used to make the novel polymer compositions used in the present invention can be ethylene or $C_3$–$C_{20}$ α-olefin homopolymers, preferably propylene, or, more preferably, interpolymers of ethylene with at least one $C_3$–$C_{20}$ α-olefin and/or $C_4$–$C_{18}$ diolefins. Homogeneous copolymers of ethylene and propylene, butene-1, hexene-1,4-methyl-1-pentene and octene-1 are preferred and copolymers of ethylene and 1-octene are especially preferred.

Either, or both, of the homogeneous ethylene polymer and the heterogeneous ethylene polymer can be an ethylene homopolymer or C3–C20 α-olefin homopolymer, preferably propylene. Preferably, however, either the homogeneous ethylene polymer or the heterogeneous ethylene polymer is an ethylene/alpha-olefin interpolymer. Ethylene polymer compositions wherein both the homogeneous ethylene polymer and the heterogeneous ethylene polymer are ethylene/alpha-olefin interpolymers are especially preferred.

The homogeneous ethylene polymer(s) and the heterogeneous ethylene polymer(s) used in the compositions described herein can each be made separately in different reactors, and subsequently blended together to make the interpolymer compositions of the present invention, by for example melt or dry blending. Preferably, though, the homogeneous ethylene polymer(s) and the heterogeneous ethylene polymer(s) used in the compositions described herein are made in a multiple reactor scheme, operated either in parallel or in series. In the multiple reactor scheme, at least one of the reactors makes the homogeneous ethylene polymer and at least one of the reactors makes the heterogeneous ethylene polymer. In a preferred mode of operation, the reactors are operated in a series configuration to make most advantage of the high polymerization temperatures allowed by the heterogeneous catalyst. When the reactors are connected in series, the polymerization reaction product from step (A) is fed directly (i.e., sequentially) into the reactor(s) for step (B) along with the ethylene/α-olefin reactants and heterogenous catalyst and solvent.

Other unsaturated monomers usefully polymerized according to the present invention include, for example, ethylenically unsaturated monomers, conjugated or nonconjugated dienes, polyenes, etc. Preferred monomers include the $C_2$–$C_{10}$ α-olefins especially ethylene, 1-propene, 1-butene, 1-hexene, 4-methyl-1-pentene, and 1-octene. Other preferred monomers include styrene, halo- or alkyl substituted styrenes, vinylbenzocyclobutane, 1,4-hexadiene, cyclopentene, cyclohexene and cyclooctene.

The density of the ethylene polymer compositions for use in the present invention is measured in accordance with ASTM D-792 and is generally from about 0.87 g/cm$^3$ to about 0.965 g/cm$^3$, preferably from about 0.88 g/cm$^3$ to about 0.95 g/cm$^3$, and especially from about 0.90 g/cm$^3$ to about 0.935 g/cm$^3$. The density of the homogeneous ethylene polymer used to make the ethylene polymer compositions is generally from about 0.865 g/cm$^3$ to about 0.92 g/cm$^3$, preferably from about 0.88 g/cm$^3$ to about 0.915 g/cm$^3$, and specially from about 0.89 g/cm$^3$ to about 0.91 g/cm$^3$. The density of the heterogeneous ethylene polymer used to make the ethylene polymer compositions is generally from about 0.9 g/cm$^3$ to about 0.965 g/cm$^3$, preferably from about 0.9 g/cm$^3$ to about 0.95 g/cm$^3$, and especially from about 0.915 g/cm$^3$ to about 0.935 g/cm$^3$.

Generally, the amount of the ethylene polymer produced using the homogeneous catalyst and incorporated into the ethylene polymer composition is from about 15 percent to about 85 percent, by weight of the composition, preferably about 25 percent to about 75 percent, by weight of the composition.

The molecular weight of the ethylene polymer compositions for use in the present invention is conveniently indicated using a melt index measurement according to ASTM D-1238, Condition 190 C/2.16 kg (formally known as "Condition (E)" and also known as $I_2$. Melt index is inversely proportional to the molecular weight of the polymer. Thus, the higher the molecular weight, the lower the melt index, although the relationship is not linear. The melt index for the ethylene polymer compositions used herein is generally from about 0.1 grams/10 minutes (g/10 min) to about 100 g/10 min, preferably from about 0.3 g/10 min to about 30 g/10 min, and especially from about 0.5 g/10 min to about 10 g/10 min.

In an especially preferred embodiment of the present invention, the polymer compositions exhibit improvements in both room and low temperature Izod impact. Such improvements are especially important in the preparation of molded articles including, but not limited to, rotomolded and injection molded articles. Improvement in both room and low temperature Izod impact is also important for other structures including, but not limited to, films such as cast film and blown film, as well as fibers.

For blend compositions exhibiting an improvement in 23° C. Izod impact, the final blend composition has a density of from about 0.940 to about 0.960, preferably from about 0.940 to about 0.955, more preferably from about 0.940 to about 0.950 g/cm3 and a melt index (I2) of from about 3.0 to about 100, preferably from about 3.0 to about 50, more preferably from about 3.0 to about 25 g/10 min. Such blend compositions comprise from about 5 to about 50, preferably from about 7 to about 50, more preferably from about 10 to about 50 percent by weight (based on the combined weights of the heterogeneous and homogenous interpolymer components) of one or more homogeneous interpolymers, which has a density of from about 0.850 to about 0.908, preferably from about 0.850 to about 0.906, more preferably from about 0.850 to about 0.903 g/cm3. Such blend compositions comprise from about 50 to about 95, preferably from about 50 to about 93, more preferably from about 50 to about 90 percent by weight (based on the combined weights of the heterogeneous and homogenous interpolymer components) of one or more heterogeneous interpolymers.

We have surprisingly found that such blend compositions exhibit an improvement in 23° C. Izod Impact of at least 5, preferably at 7, more preferably at least 10 and even more preferably at least 25%, over a blend of the same final melt index and density, but wherein the density of homogenous interpolymer component(s) is greater than or equal to 0.909 g/cm$^3$.

For blend compositions exhibiting an improvement in 0° C. Izod impact, the final blend composition has a density of from about 0.930 to about 0.960 g/cm3 and a melt index (I2) of from about 0.5 to about 4.0 g/10 min. Such blend compositions comprise from about 10 to about 50 percent by weight (based on the combined weights of the heterogeneous and homogenous interpolymer components) of one or more homogeneous interpolymers, which has a density of from about 0.850 to about 0.903 g/cm3. Such blend compositions comprise from about 50 to about 90 percent by weight (based on the combined weights of the heterogeneous and homogenous interpolymer components) of one or more heterogeneous interpolymers. We have surprisingly found that such blend compositions exhibit an improvement in 0° C. Izod Impact of at least 5, preferably at 7, more preferably at least 10 and even more preferably at least 250%, over a blend of the same final melt index and density, but wherein the density of homogenous interpolymer component(s) is greater than or equal to 0.909 g/cm$^3$.

For blend compositions exhibiting an improvement in −20° C. Izod impact, the final blend composition has a density of from about 0.935 to about 0.945 g/cm3 and a melt index ($I_{12}$) of from about 0.5 to about 3.3 g/10 min. Such blend compositions comprise from about 15 to about 50 percent by weight (based on the combined weights of the heterogeneous and homogenous interpolymer components) of one or more homogeneous interpolymers, which has a density of from about 0.850 to about 0.890 g/cm3. Such blend compositions comprise from about 50 to about 85 percent by weight (based on the combined weights of the heterogeneous and homogenous interpolymer components) of one or more heterogeneous interpolymers. We have surprisingly found that such blend compositions exhibit an improvement in −20° C. Izod Impact of at least 5, preferably at 7, more preferably at least 10 and even more preferably at least 250%, over a blend of the same final melt index and density, but wherein the density of homogenous interpolymer component(s) is greater than or equal to 0.909 g/cm$^3$.

While not wishing to be held by any theory, we believe the observed step change in Izod impact which occurs when the density of Component A is less than 0.909 g/cm3 (as illustrated in FIG. 1) result from the occurrence of a particular solid state morphology in Component A. This morphology has been described by Florey as a "fringed micelle" structure, which occurs because the polymer chains cannot fold upon themselves and form well ordered spherulites.

Typically to select a final blend composition, one would select Component A such that it has the claimed density range and other property limitations as well as exhibiting a fringe micelle structure. The additional blend component(s) are then selected on the basis of the final desired modulus (typically based on final blend density) and/or processability (typically based on final molecular weight and molecular weight distribution) required for the given application and method of fabrication. Additional criteria for the selection of the additional blend component(s) may also include ESCR, creep and other tensile properties.

Additives such as antioxidants (e.g., hindered phenols such as, for example, Irganox™ 1010 a registered trademark of Ciba Geigy), phosphites (e.g., Irgafos™ 168 a registered trademark of Ciba Geigy), U.V. stabilizers, fire retardants, crosslinking agents, blowing agents, compatibilizers, cling additives (e.g., polyisobutylene), slip agents (such as erucamide and/or stearamide), antiblock additives, colorants, pigments, and the like can also be used in the overall blend compositions employed in the present invention.

For the compositions of the present invention having improved impact properties. processing aids, which are also referred to herein as plasticizers, can also be used in the overall blend compositions. These processing aids include, but are not limited to, the phthalates, such as dioctyl phthalate and diisobutyl phthalate, natural oils such as lanolin, and paraffin, naphthenic and aromatic oils obtained from petroleum refining, and liquid resins from rosin or petroleum feed stocks. Exemplary classes of oils useful as processing aids include white mineral oil (such as Kaydol™ oil (available from and a registered trademark of Witco), and Shellflex™ 371 naphthenic oil (available from and a registered trademark of Shell Oil Company). Another suitable oil is Tuflo™ oil (available from and a registered trademark of Lyondell).

Tackifiers can also be included in the overall blend compositions employed in the present invention to alter the processing performance of the polymer and thus can extend the available application temperature window of the articles. A suitable tackifier may be selected on the basis of the criteria outlined by Hercules in J. Simons, Adhesives Age, "The HMDA Concept: A New Method for Selection of Resins", November 1996. This reference discusses the importance of the polarity and molecular weight of the resin in determining compatibility with the polymer. In the case of substantially random interpolymers of at least one α-olefin and a vinyl aromatic monomer, preferred tackifiers will have some degree of aromatic character to promote compatibility, particularly in the case of substantially random interpolymers having a high content of the vinyl aromatic monomer.

Tackifying resins can be obtained by the polymerization of petroleum and terpene feedstreams and from the derivatization of wood, gum, and tall oil rosin. Several classes of tackifiers include wood rosin, tall oil and tall oil derivatives, and cyclopentadiene derivatives, such as are described in United Kingdom patent application GB 2.032,439A. Other classes of tackifiers include aliphatic C5 resins, polyterpene resins, hydrogenated resins, mixed aliphatic-aromatic resins, rosin esters, natural and synthetic terpenes, terpene-phenolics, and hydrogenated rosin esters.

Also included as a potential component of the polymer compositions used in the present invention are various organic and inorganic fillers, the identity of which depends upon the type of application for which the molded parts are to be utilized. The fillers can also be included in either blend Component A and/or blend Component B or the overall blend compositions employed to prepare the fabricated articles of the present invention. Representative examples of such fillers include organic and inorganic fibers such as those made from asbestos, boron, graphite, ceramic, glass, metals (such as stainless steel) or polymers (such as aramid fibers) talc, carbon black, carbon fibers, calcium carbonate, alumina trihydrate, glass fibers, marble dust, cement dust, clay, feldspar, silica or glass, fumed silica, alumina, magnesium oxide, magnesium hydroxide, antimony oxide, zinc oxide, barium sulfate, aluminum silicate, calcium silicate, titanium dioxide, titanates, aluminum nitride, B203, nickel powder or chalk.

Other representative organic or inorganic, fiber or mineral, fillers include carbonates such as barium. calcium or magnesium carbonate; fluorides such as calcium or sodium aluminum fluoride; hydroxides such as aluminum hydroxide; metals such as aluminum, bronze, lead or zinc; oxides such as aluminum, antimony, magnesium or zinc oxide, or silicon or titanium dioxide; silicates such as asbestos, mica, clay (kaolin or calcined kaolin), calcium silicate, feldspar, glass (ground or flaked glass or hollow glass spheres or microspheres or beads, whiskers or filaments), nepheline, perlite, pyrophyllite, talc or wollastonite; sulfates such as barium or calcium sulfate; metal sulfides; cellulose, in forms such as wood or shell flour; calcium terephthalate; and liquid crystals. Mixtures of more than one such filler may be used as well.

These additives are employed in functionally equivalent amounts known to those skilled in the art. When used in proper quantities such ingredients will typically not render the composition unsuitable for rotational molding or injection molding.

For example, the amount of antioxidant employed is that amount which prevents the polymer or polymer blend from undergoing oxidation at the temperatures and environment employed during storage and ultimate use of the polymers. Such amount of antioxidants is usually in the range of from 0.01 to 10, preferably from 0.05 to 5, more preferably from 0.1 to 2 percent by weight based upon the weight of the polymer or polymer blend. Similarly, the amounts of any of the other enumerated additives are the functionally equivalent amounts such as the amount to render the polymer or polymer blend antiblocking, to produce the desired result, to provide the desired color from die colorant or pigment. Such additives can suitably be employed in the range of from 0.05 to 50, preferably from 0.1 to 35, more preferably from 0.2 to 20 percent by weight based upon weight of the polymer or polymer blend, to the extent that they do not interfere with the enhanced composition properties discovered by Applicants.

When used in proper quantities such ingredients will typically not render the composition unsuitable for rotational molding. However, large amounts of some ingredients, in particular conventional fillers such as calcium carbonate, may harm the rotational molding properties of the composition. For this reason, it is preferable to add less than about 10, preferably less than about 5 weight percent filler to the compositions used for rotational molding.

The Homogeneous Catalysts

The homogeneous catalysts used in the invention are based on those monocyclopentadienyl transition metal complexes described in the art as constrained geometry metal complexes. These catalysts are highly efficient, meaning that they are efficient enough such that the catalyst residues left in the polymer do not influence the polymer quality. Typically, less than or equal to about 10 ppm of the metal atom (designated herein as "M") is detectable and, when using the appropriate cocatalyst (e.g., one of the aluminoxanes described herein) the detectable aluminum residue is less than or equal to about 250 ppm. Suitable constrained geometry catalysts for use herein preferably include constrained geometry catalysts as disclosed in U.S. application Ser. Nos.: 545,403, filed Jul. 3, 1990; 758,654, filed Sep. 12, 1991; 758,660, filed Sep. 12, 1991; 720,041, filed Jun. 24, 1991; and 817,202, filed Jan. 6, 1992, the teachings of all of which are incorporated herein by reference. The monocyclopentadienyl transition metal olefin polymerization catalysts taught in U.S. Pat. No. 5,026,798 (Canich), the teachings of which are incorporated herein by reference, are also suitable for use in preparing the polymers of the present invention.

The foregoing catalysts may be further described as comprising a metal coordination complex comprising a metal of group 4 of the Periodic Table of the Elements and a delocalized π-bonded moiety substituted with a constrain-inducing moiety, said complex having a constrained geometry about the metal atom such that the angle at the metal between the centroid of the delocalized, substituted π-bonded moiety and the center of at least one remaining substituent is less than such angle in a similar complex containing a similar π-bonded moiety lacking in such constrain-inducing substituent, and provided further that for such complexes comprising more than one delocalized, substituted π-bonded moiety, only one thereof for each metal atom of the complex is a cyclic, delocalized, substituted π-bonded moiety. The catalyst further comprises an activating cocatalyst.

Preferred catalyst complexes correspond to the formula:

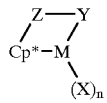

wherein:
M is a metal of group 4 of the Periodic Table of the Elements;
Cp* is a cyclopentadienyl or substituted cyclopentadienyl group bound in an $\eta^5$ bonding mode to M;
Z is a moiety comprising boron, or a member of group 14 of the Periodic Table of the Elements, and optionally sulfur or oxygen, said moiety having up to 20 non-hydrogen atoms, and optionally Cp* and Z together form a fused ring system;
X independently each occurrence is an anionic ligand group having up to 30 non-hydrogen atoms;
n is 1 or 2; and
Y is an anionic or nonanionic ligand group bonded to Z and M comprising nitrogen, phosphorus, oxygen or sulfur and having up to 20 non-hydrogen atoms, optionally Y and Z together form a fused ring system.

More preferably still, such complexes correspond to the formula:

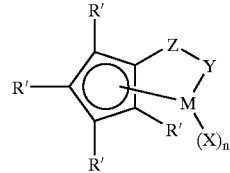

wherein:
R' each occurrence is independently selected from the group consisting of hydrogen, alkyl, aryl, and silyl, and combinations thereof having up to 20 non-hydrogen atoms;
X each occurrence independently is selected from the group consisting of hydride, halo, alkyl, aryl, silyl, aryloxy, alkoxy, amide, siloxy and combinations thereof having up to 20 non-hydrogen atoms;
Y is —O—, —S—, —NR*—, —PR*—, or a neutral two electron donor ligand selected from the group consisting of OR*, SR*, NR*$_2$ or PR*$_2$;
M is as previously defined; and
Z is SiR*$_2$, CR*$_2$, SiR*$_2$SiR*$_2$, CR*$_2$CR*$_2$, CR*=CR*, CR*$_2$SiR*$_2$, BR*; wherein R* each occurrence is independently selected from the group consisting of hydrogen, alkyl, aryl, silyl groups having up to 20 non-hydrogen atoms, and mixtures thereof, or two or more R* groups from Y, Z, or both Y and Z form a fused ring system; and n is 1 or 2.

Most highly preferred complex compounds are amidosilane- or amidoalkanediyl- compounds corresponding to the formula:

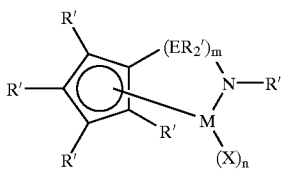

wherein:
M is titanium, zirconium or hafnium, bound in an $h^5$ bonding mode to the cyclopentadienyl group;

R' each occurrence is independently selected from the group consisting of hydrogen, alkyl and aryl and combinations thereof having up to 7 carbon atoms, or silyl;

E is silicon or carbon;

X independently each occurrence is hydride, halo, alkyl, aryl, aryloxy or alkoxy of up to 10 carbons, or silyl;

m is 1 or 2; and n is 1 or 2.

Examples of the above most highly preferred metal coordination compounds include compounds wherein the R' on the amido group is methyl, ethyl, propyl, butyl, pentyl, hexyl, (including isomers), norbornyl, benzyl, phenyl, etc.; the cyclopentadienyl group is cyclopentadienyl, indenyl, tetrahydroindenyl, fluorenyl, octahydrofluorenyl, etc.; R' on the foregoing cyclopentadienyl groups each occurrence is hydrogen, methyl, ethyl, propyl, butyl, pentyl, hexyl, (including isomers), norbornyl, benzyl, phenyl, etc.; and X is chloro, bromo, iodo, methyl, ethyl, propyl, butyl, pentyl, hexyl, (including isomers), norbornyl, benzyl, phenyl, etc.

Specific compounds include: (tert-butylamido) (tetramethyl-$\eta^5$-cyclopentadienyl)-1,2-ethanediylzirconium dichloride, (tert-butylamido)(tetramethyl-$\eta^5$-cyclopentadienyl)-1,2-ethanediyltitanium dichloride, (methylamido)(tetramethyl-$\eta^5$-cyclopentadienyl)-1,2-ethanediylzirconium dichloride, (methylamido) (tetramethyl-$\eta^5$-cyclopentadienyl)-1,2-ethanediyl-titanium dichloride, (ethylamido)(tetramethyl-$\eta^5$-cyclopentadienyl)-methylenetitanium dichloride, (tertbutylamido)dibenzyl (tetramethyl-$\eta^5$-cyclopentadienyl) silanezirconium dibenzyl, (benzylamido)dimethyl-(tetramethyl-$\eta^5$-cyclopentadienyl)silanetitanium dichloride, (phenylphosphido)dimethyl-(tetramethyl-$\eta^5$-cyclopentadienyl)silanezirconium dibenzyl, (tertbutylamido)dimethyl(tetramethyl-$\eta^5$-cyclopentadienyl) silanetitanium dimethyl, and the like.

The catalyst compositions are derived from reacting the metal complex compounds with a suitable activating agent or cocatalyst or combination of cocatalysts. Suitable cocatalysts for use herein include polymeric or oligomeric aluminoxanes, especially aluminoxanes soluble in non-aromatic hydrocarbon solvent, as well as inert, compatible, noncoordinating, ion forming compounds; or combinations of polymeric/oligomeric aluminoxanes and inert, compatible, noncoordinating, ion forming compounds. Preferred cocatalysts contain inert, noncoordinating, boron compounds.

Ionic active catalyst species which can be used to polymerize the polymers described herein correspond to the formula:

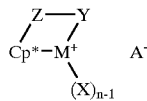

wherein:
M is a metal of group 4 of the Periodic Table of the Elements;

Cp* is a cyclopentadienyl or substituted cyclopentadienyl group bound in an $\eta^5$ bonding mode to M;

Z is a moiety comprising boron, or a member of group 14 of the Periodic Table of the Elements, and optionally sulfur or oxygen, said moiety having up to 20 non-hydrogen atoms, and optionally Cp* and Z together form a fused ring system;

X independently each occurrence is an anionic ligand group having up to 30 non-hydrogen atoms;

n is 1 or 2; and

A- is a noncoordinating, compatible anion.

One method of making the ionic catalyst species which can be utilized to make the polymers of the present invention involve combining:

a) at least one first component which is a mono (cyclopentadienyl) derivative of a metal of Group 4 of the Periodic Table of the Elements as described previously containing at least one substituent which will combine with the cation of a second component (described hereinafter) which first component is capable of forming a cation formally having a coordination number that is one less than its valence, and b) at least one second component which is a salt of a Bronsted acid and a noncoordinating, compatible anion.

Compounds useful as a second component in the preparation of the ionic catalysts useful in this invention can comprise a cation, which is a Bronsted acid capable of donating a proton, and a compatible noncoordinating anion. Preferred anions are those containing a single coordination complex comprising a charge-bearing metal or metalloid core which anion is relatively large (bulky), capable of stabilizing the active catalyst species (the Group 4 cation) which is formed when the two components are combined and sufficiently labile to be displaced by olefinic, diolefinic and acetylenically unsaturated substrates or other neutral Lewis bases such as ethers, nitrites and the like. Compounds containing anions which comprise coordination complexes containing a single metal or metalloid atom are, of course, well known and many, particularly such compounds containing a single boron atom in the anion portion, are available commercially. In light of this, salts containing anions comprising a coordination complex containing a single boron atom are preferred.

Highly preferably, the second component useful in the preparation of the catalysts of this invention may be represented by the following general formula:

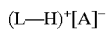

wherein:
L is a neutral Lewis base;

(L—H)+ is a Bronsted acid; and

[A]- is a compatible, noncoordinating anion.

More preferably [A]⁻ corresponds to the formula:

[BQ$_q$]⁻ wherein:

B is boron in a valence state of 3; and

Q independently each occurrence is selected from the Group consisting of hydride, dialkylamido, halide, alkoxide, aryloxide, hydrocarbyl, and substituted-hydrocarbyl radicals of up to 20 carbons with the proviso that in not more than one occurrence is Q halide.

Illustrative, but not limiting, examples of boron compounds which may be used as a second component in the preparation of the improved catalysts of this invention are trialkyl-substituted ammonium salts such as triethylammonium tetraphenylborate, tripropylammonium tetraphenylborate, tris(n-butyl)ammonium tetraphenylborate, trimethylammonium tetrakis(p-tolyl) borate, tributylammonium tetrakis(pentafluorophenyl) borate, tripropylammonium tetrakis(2,4-dimethylphenyl) borate, tributylammonium tetrakis(3,5-dimethylphenyl) borate, triethylammonium tetrakis(3,5-di-trifluoromethylphenyl)borate and the like. Also suitable are N,N-dialkylanilinium salts such as N,N-dimethylanilinium tetraphenylborate, N,N-diethylanilinium tetraphenylborate, N,N,2,4,6-pentamethylanilinium tetraphenylborate and the like; dialkylammonium salts such as di(i-propyl)ammonium tetrakis(pentafluorophenyl)borate, dicyclohexylammonium tetraphenylborate and the like; and triarylphosphonium salts such as triphenylphosphonium tetraphenylborate, tris (methylphenyl)phosphonium tetrakis(pentafluorophenyl) borate, tris(dimethylphenyl)phosphonium tetraphenylborate and the like.

Preferred ionic catalysts are those having a limiting charge separated structure corresponding to the formula:

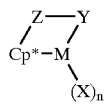

wherein:

M is a metal of group 4 of the Periodic Table of the Elements;

Cp* is a cyclopentadienyl or substituted cyclopentadienyl group bound in an h⁵ bonding mode to M;

Z is a moiety comprising boron, or a member of group 14 of the Periodic Table of the Elements, and optionally sulfur or oxygen, said moiety having up to 20 non-hydrogen atoms, and optionally Cp* and Z together form a fused ring system;

X independently each occurrence is an anionic ligand group having up to 30 non-hydrogen atoms;

n is 1 or 2; and

XA*⁻ is ⁻X(B(C$_6$F$_5$)$_3$).

This class of cationic complexes can also be conveniently prepared by contacting a metal compound corresponding to the formula:

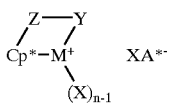

wherein:

Cp*, M, and n are as previously defined, with tris(pentafluorophenyl)borane cocatalyst under conditions to cause abstraction of X and formation of the anion ⁻X(B(C$_6$F$_5$)$_3$).

Preferably X in the foregoing ionic catalyst is C$_1$–C$_{10}$ hydrocarbyl, most preferably methyl or benzyl.

The preceding formula is referred to as the limiting, charge separated structure. However, it is to be understood that, particularly in solid form, the catalyst may not be fully charge separated. That is, the X group may retain a partial covalent bond to the metal atom, M. Thus, the catalysts may be alternately depicted as possessing the formula:

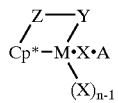

The catalysts are preferably prepared by contacting the derivative of a Group 4 metal with the tris (pentafluorophenyl)borane in an inert diluent such as an organic liquid. Tris(pentafluorphenyl)borane is a commonly available Lewis acid that may be readily prepared according to known techniques. The compound is disclosed in Marks, et al. *J. Am. Chem. Soc.* 1991, 113, 3623–3625 for use in alkyl abstraction of zirconocenes.

The homogeneous catalyst can contain either no aluminum cocatalyst or only a small amount (i.e., from about 3:1 Al:M ratio to about 100:1 Al:M ratio) of aluminum cocatalyst. For example, the cationic complexes used as homogeneous catalysts may be further activated by the use of an additional activator such as an alkylaluminoxane. Preferred co-activators include methylaluminoxane, propylaluminoxane, isobutylaluminoxane, combinations thereof and the like. So-called modified methylaluminoxane (MMAO) is also suitable for use as a cocatalyst. One technique for preparing such modified aluminoxane is disclosed in U.S. Pat. No. 4,960,878 (Crapo et al.), the disclosure of which is incorporated herein by reference. Aluminoxanes can also be made as disclosed in U.S. Pat. No. 4,544,762 (Kaminsky et al.); U.S. Pat. No. 5,015,749 (Schmidt et al.); U.S. Pat. No. 5,041,583 (Sangokoya); U.S. Pat. No. 5,041,584 (Crapo et al.); and U.S. Pat. No. 5,041,585 (Deavenport et al.), the disclosures of all of which are incorporated herein by reference.

The homogeneous catalysts useful for the production of the ethylene interpolymers of narrow composition and molecular weight distribution may also be supported on an inert support. Typically, the support can be any solid, particularly porous supports such as talc or inorganic oxides, or resinous support materials such as a polyolefin. Preferably, the support material is an inorganic oxide in finely divided form.

Suitable inorganic oxide materials which are desirably employed in accordance with this invention include Group IIA, IIIA, IVA, or IVB metal oxides such as silica, alumina, and silica-alumina and mixtures thereof. Other inorganic oxides that may be employed either alone or in combination with the silica, alumina or silica-alumina are magnesia, titania, zirconia, and the like. Other suitable support materials, however, can be employed, for example, finely divided polyolefins such as finely divided polyethylene.

The metal oxides generally contain acidic surface hydroxyl groups which will react with the homogeneous catalyst component added to the reaction slurry. Prior to use, the inorganic oxide support is dehydrated, i.e., subjected to a thermal treatment in order to remove water and reduce the concentration of the surface hydroxyl groups. The treatment is carried out in vacuum or while purging with a dry inert gas such as nitrogen at a temperature of about 100° C. to about 1000° C., and preferably, from about 300° C. to about 800° C. Pressure considerations are not critical. The duration of the thermal treatment can be from about 1 to about 24 hours; however, shorter or longer times can be employed provided equilibrium is established with the surface hydroxyl groups.

The Heterogeneous Catalysts

The heterogeneous catalysts suitable for use in the invention are typical supported, Ziegler-type catalysts which are particularly useful at the high polymerization temperatures of the solution process. Examples of such compositions are those derived from organomagnesium compounds, alkyl halides or aluminum halides or hydrogen chloride, and a transition metal compound. Examples of such catalysts are described in U.S. Pat. No. 4,314,912 (Lowery, Jr. et al.), U.S. Pat. No. 4,547,475 (Glass et al.), and U.S. Pat. No. 4,612,300 (Coleman, III), the teachings of which are incorporated herein by reference.

Particularly suitable organomagnesium compounds include, for example, hydrocarbon soluble dihydrocarbylmagnesium such as the magnesium dialkyls and the magnesium diaryls. Exemplary suitable magnesium dialkyls include particularly n-butyl-sec-butylmagnesium, diisopropylmagnesium, di-n-hexylmagnesium, isopropyl-n-butyl-magnesium, ethyl-n-hexylmagnesium, ethyl-n-butylmagnesium, di-n-octylmagnesium and others wherein the alkyl has from 1 to 20 carbon atoms. Exemplary suitable magnesium diaryls include diphenylmagnesium, dibenzylmagnesium and ditolylmagnesium. Suitable organomagnesium compounds include alkyl and aryl magnesium alkoxides and aryloxides and aryl and alkyl magnesium halides with the halogen-free organomagnesium compounds being more desirable.

Among the halide sources which can be employed herein are the active non-metallic halides, metallic halides, and hydrogen chloride.

Suitable non-metallic halides are represented by the formula R'X wherein R' is hydrogen or an active monovalent organic radical and X is a halogen. Particularly suitable non-metallic halides include, for example, hydrogen halides and active organic halides such as t-alkyl halides, allyl halides, benzyl halides and other active hydrocarbyl halides wherein hydrocarbyl is as defined hereinbefore. By an active organic halide is meant a hydrocarbyl halide that contains a labile halogen at least as active, i.e., as easily lost to another compound, as the halogen of sec-butyl chloride, preferably as active as t-butyl chloride. In addition to the organic monohalides, it is understood that organic dihalides, trihalides and other polyhalides that are active as defined hereinbefore are also suitably employed. Examples of preferred active non-metallic halides include hydrogen chloride, hydrogen bromide, t-butyl chloride, t-amyl bromide, allyl chloride, benzyl chloride, crotyl chloride, methylvinyl carbinyl chloride, a-phenylethyl bromide, diphenyl methyl chloride and the like. Most preferred are hydrogen chloride, t-butyl chloride, allyl chloride and benzyl chloride.

Suitable metallic halides which can be employed herein include those represented by the formula $MR_{y-a}X_a$ wherein:

M is a metal of Groups IIB, IIIA or IVA of Mendeleev's Periodic Table of Elements, R is a monovalent organic radical, X is a halogen, Y has a value corresponding to the valence of M, and a has a value from 1 to y.

Preferred metallic halides are aluminum halides of the formula $AlR_{3-a}X_a$ wherein:

each R is independently hydrocarbyl as hereinbefore defined such as alkyl,

X is a halogen and a is a number from 1 to 3.

Most preferred are alkylaluminum halides such as ethylaluminum sesquichloride, diethylaluminum chloride, ethylaluminum dichloride, and diethylaluminum bromide, with ethylaluminum dichloride being especially preferred. Alternatively, a metal halide such as aluminum trichloride or a combination of aluminum trichloride with an alkyl aluminum halide or a trialkyl aluminum compound may be suitably employed.

It is understood that the organic moieties of the aforementioned organomagnesium, e.g., R", and the organic moieties of the halide source, e.g., R and R', are suitably any other organic radical provided that they do not contain functional groups that poison conventional Ziegler catalysts.

The magnesium halide can be preformed from the organomagnesium compound and the halide source or it can be formed in situ in which instance the catalyst is preferably prepared by mixing in a suitable solvent or reaction medium (1) the organomagnesium component and (2) the halide source, followed by the other catalyst components.

Any of the conventional Ziegler-Natta transition metal compounds can be usefully employed as the transition metal component in preparing the supported catalyst component. Typically, the transition metal component is a compound of a Group IVB, VB, or VIB metal. The transition metal component is generally, represented by the formulas: $TrX'_{4-q}(OR^1)_q$, $TrX'_{4-q}R^2_q$, $VOX'_3$ and $VO(OR^1)_3$.

Tr is a Group IVB, VB, or VIB metal, preferably a Group IVB or VB metal, preferably titanium, vanadium or zirconium, q is 0 or a number equal to or less than 4, X' is a halogen, and $R^1$ is an alkyl group, aryl group or cycloalkyl group having from 1 to 20 carbon atoms, and $R^2$ is an alkyl group, aryl group, aralkyl group, substituted aralkyls, and the like. The aryl, aralkyls and substituted aralkys contain 1 to 20 carbon atoms, preferably 1 to 10 carbon atoms. When the transition metal compound contains a hydrocarbyl group, $R^2$, being an alkyl, cycloalkyl, aryl, or aralkyl group, the hydrocarbyl group will preferably not contain an H atom in the position beta to the metal carbon bond. Illustrative but non-limiting examples of aralkyl groups are methyl, neo-pentyl, 2,2-dimethylbutyl, 2,2-dimethylhexyl; aryl groups such as benzyl; cycloalkyl groups such as 1-norbornyl. Mixtures of these transition metal compounds can be employed if desired.

Illustrative examples of the transition metal compounds include $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_6H_{13})_2Cl_2$, $Ti(OC_8H_{17})_2Br_2$, and $Ti(OC_{12}H_{25})Cl_3$, $Ti(O-i-C_3H_7)_4$, and $Ti(O-n-C_4H_9)_4$.

Illustrative examples of vanadium compounds include VCl$_4$, VOCl$_3$, VO(OC$_2$H$_5$)$_3$, and VO (OC$_4$H$_9$)$_3$.

Illustrative examples of zirconium compounds include ZrCl$_4$, ZrCl$_3$(OC$_2$H$_5$), ZrCl$_2$(OC$_2$H$_5$)$_2$, ZrCl(OC$_2$H$_5$)$_3$, Zr(OC$_2$H$_5$)$_4$, ZrCl(OC$_4$H$_9$), ZrCl$_2$(OC$_4$H$_9$)$_2$, and ZrCl (OC$_4$H$_9$)$_3$.

As indicated above, mixtures of the transition metal compounds may be usefully employed, no restriction being imposed on the number of transition metal compounds which may be contracted with the support. Any halogenide and alkoxide transition metal compound or mixtures thereof can be usefully employed. The previously named transition metal compounds are especially preferred with vanadium tetachloride, vanadium oxychloride, titanium tetraisopropoxide, titanium tetrabutoxide, and titanium tetrachloride being most preferred.

Suitable catalyst materials may also be derived from an inert oxide supports and transition metal compounds. Examples of such compositions suitable for use in the solution polymerization process are described in U.S. Pat. No. 5,231,151, the entire contents of which are incorporated herein by reference.

The inorganic oxide support used in the preparation of the catalyst may be any particulate oxide or mixed oxide as previously described which has been thermally or chemically dehydrated such that it is substantially free of adsorbed moisture.

The specific particle size, surface area, pore volume, and number of surface hydroxyl groups characteristic of the inorganic oxide are not critical to its utility in the practice of the invention. However, since such characteristics determine the amount of inorganic oxide to be employed in preparing the catalyst compositions, as well as affecting the properties of polymers formed with the aid of the catalyst compositions, these characteristics must frequently be taken into consideration in choosing an inorganic oxide for use in a particular aspect of the invention. In general, optimum results are usually obtained by the use of inorganic oxides having an average particle size in the range of about 1 to 100 microns, preferably about 2 to 20 microns; a surface area of about 50 to 1,000 square meters per gram, preferably about 100 to 400 square meters per gram; and a pore volume of about 0.5 to 3.5 cm$^3$ per gram; preferably about 0.5 to 2 cm$^3$ per gram.

In order to further improve catalyst performance, surface modification of the support material may be desired. Surface modification is accomplished by specifically treating the support material such as silica, aluminia or silica-alumina with an organometallic compound having hydrolytic character. More particularly, the surface modifying agents for the support materials comprise the organometallic compounds of the metals of Group IIA and IIIA of the Periodic Table. Most preferably the organometallic compounds are selected from magnesium and aluminum organometallics and especially from magnesium and aluminum alkyls or mixtures thereof represented by the formulas and R$^1$MgR$^2$ and R$^1$R$^2$AlR$^3$ wherein each of R$^1$, R$^2$ and R$^3$ which may be the same or different are alkyl groups, aryl groups, cycloalkyl groups, aralkyl groups, alkoxide groups, alkadienyl groups or alkenyl groups. The hydrocarbon groups R$^1$, R$^2$ and R$^3$ can contain between 1 and 20 carbon atoms and preferably from 1 to about 10 carbon atoms.

The surface modifying action is effected by adding the organometallic compound in a suitable solvent to a slurry of the support material. Contact of the organometallic compound in a suitable solvent and the support is maintained from about 30 to 180 minutes and preferably form 60 to 90 minutes at a temperature in the range of 20° to 100° C. The diluent employed in slurrying the support can be any of the solvents employed in solubilizing the organometallic compound and is preferably the same.

In order to more readily produce interpolymer compositions of controlled composition and molecular weight distribution, the constrained-geometry component catalyst and the Ziegler-type transition metal catalyst component should have different reactivity ratios. The reactivity ratio of the homogeneous catalyst may be higher than the reactivity ratio of the heterogeneous catalyst. In such instances, the contribution of the narrow composition and molecular weight distribution polymer molecules, formed in the first reactor, to the whole interpolymer product would yield improvements in thermal resistance and crystallization behavior of the resin. Preferably, but not limiting, the reactivity ratio of the homogeneous catalyst introduced into the first reactor should be lower than the reactivity ratio of the heterogeneous catalyst in order to have the most benefit of a simplified process and to produce interpolymers of the most suitable compositions.

The reactivity ratios of the metallocenes and transition metal components in general are obtained by methods well known such as, for example, as described in "Linear Method for Determining Monomer Reactivity Ratios in Copolymerization", M. Fineman and S. D. Ross, *J. Polymer Science* 5, 259 (1950) or "Copolymerization", F. R. Mayo and C. Walling, *Chem. Rev.* 46, 191 (1950), the disclosures of both of which are incorporated herein in their entirety by reference.

For example, to determine reactivity ratios, the most widely used copolymerization model is based on the following equations:

$$M_1^* + M_1 \xrightarrow{k_{11}} M_1^* \tag{1}$$

$$M_1^* + M_2 \xrightarrow{k_{12}} M_2^* \tag{2}$$

$$M_2^* + M_1 \xrightarrow{k_{21}} M_1^* \tag{3}$$

$$M_2^* + M_2 \xrightarrow{k_{22}} M_2^* \tag{4}$$

where $M_1$, $M_2$ refer to monomer molecules and $M_1^*$ or $M_2^*$ refer to a growing polymer chain to which monomer $M_1$ or $M_2$ has most recently attached. $M_1$ is typically ethylene; $M_2$ is typically an α-olefin comonomer.

The $k_{ij}$ values are the rate constants for the indicated reactions. In this case, $k_{11}$ represents the rate at which an ethylene unit inserts into a growing polymer chain in which the previously inserted monomer unit was also ethylene. The reactivity rates follows as: $r_1 = k_{11}/k_{12}$ and $r_2 = k_{22}/k_{21}$ wherein $k_{11}$, $k_{12}$, $k_{21}$ are the rate constants for ethylene (1) or comonomer (2) addition to a catalyst site where the last polymerized monomer is ethylene ($k_{1x}$) or comonomer (2) ($k_{2x}$). A lower value of $r_1$ for a particular catalyst translates into the formation of an interpolymer of higher comonomer content produced in a fixed reaction environment. In a preferred embodiment of the invention, the reactivity ratio, $r_1$, of the homogeneous catalyst is less than half that of the heterogeneous catalyst.

Therefore, in the desirable practice of the invention, the homogeneous catalyst produces a polymer of higher comonomer content than that of the polymer produced by the heterogeneous in a reaction environment which is low in the concentration of the comonomer. As the contents of the first reactor enter a second reactor, the concentration of the comonomer in the second reactor is reduced. Hence, the reaction environment in which the heterogeneous catalyst forms polymer is such that a polymer containing a lower comonomer content is produced. Under such reaction conditions, the polymer so formed with have a well-defined and narrow composition distribution and narrow molecular weight distribution. The resulting whole interpolymer product can be readily controlled by choice of catalysts, comonomers, and reaction temperatures in an economical and reproducible fashion. In addition, simple changes in monomer concentrations and conversions in each reactor allows the manufacture of a broad range of interpolymer products.

The heterogeneous polymers and interpolymers used to make the novel polymer compositions of the present invention can be ethylene homopolymers or $C_3$–$C_{20}$ α-olefin homopolymers, preferably propylene, or, preferably, interpolymers of ethylene with at least one $C_3$–$C_{20}$ α-olefin and/or $C_4$–$C_{18}$ diolefins. Heterogen copolymers of ethylene and 1-octene are especially preferred.

Polymerization

The polymerization conditions for manufacturing the polymers of the present invention are generally those useful in the solution polymerization process, although the application of the present invention is not limited thereto. Slurry and gas phase polymerization processes are also believed to be useful, provided the proper catalysts and polymerization conditions are employed.

Multiple reactor polymerization processes are particularly useful in the present invention, such as those disclosed in U.S. Pat. No. 3,914,342 (Mitchell), the disclosure of which is incorporated herein by reference. The multiple reactors can be operated in series or in parallel, with at least one constrained geometry catalyst employed in one of the reactors and at least one heterogeneous catalyst employed in at least one other reactor. Preferably, the polymerization temperature of the constrained geometry portion of the polymerization is lower than that of the heterogeneous polymerization portion of the reaction.

Separation of the interpolymer compositions from the high temperature polymer solution can be accomplished by use of devolatilizing apparatus known to those skilled in the art. Examples include U.S. Pat. No. 5,084,134 (Mattiussi et al.), U.S. Pat. No. 3,014,702 (Oldershaw et al.), U.S. Pat. No. 4,808,262 (Aneja et al.), U.S. Pat. No. 4,564,063 (Tollar), U.S. Pat. No. 4,421,162 (Tollar) or U.S. Pat. No. 3,239,197 (Tollar), the disclosures of which are incorporated herein in their entirety by reference.

Applications of the Interpolymer Compositions

Films particularly benefit from such interpolymer compositions. Films and film structures having the novel properties described herein can be made using conventional hot blown film fabrication techniques or other biaxial orientation process such as tenter frames or double bubble processes. Conventional hot blown film processes are described, for example, in *The Encyclopedia of Chemical Technology*, Kirk-Othmer, Third Edition, John Wiley & Sons, New York, 1981, Vol. 16, pp. 416–417 and Vol. 18, pp. 191–192, the disclosure of which are incorporated herein by reference. Biaxial orientation film manufacturing process such as described in a "double bubble" process as in U.S. Pat. No. 3,456,044 (Pahlke), and the processes described in U.S. Pat. No. 4,865,902 (Golike et al.), U.S. Pat. No. 4,352,849 (Mueller), U.S. Pat. No. 4,820,557 (Warren), U.S. Pat. No. 4,927,708 (Herran et al.), U.S. Pat. No. 4,963,419 (Lustig et al.), and U.S. Pat. No. 4,952,451 (Mueller), the disclosures of each of which are incorporated herein by reference, can also be used to make novel film structures from the novel interpolymer compositions. Novel property combinations of such films include unexpectedly high machine and cross direction secant modulus, both first and second machine and cross direction yield, dart impact, cross direction tensile, clarity, 20° gloss, 45° gloss, low haze, low blocking force and low coefficient of friction (COF). In addition, these interpolymer compositions have better resistance to melt fracture (measured by determining onset of gross melt fracture and/or surface melt fracture, as described in U.S. Pat. Nos. 5,272,236 and 5,278,272, the entire contents of which are herein incorporated by reference.

In a preferred embodiment the compositions of the present invention are used rotational molding and demonstrate improved room and low temperature impact properties and improved processability. Typically the rotational molding process with the above-described compositions comprises the steps of preparing the composition. The composition can be manufactured in powder or pellet form. For rotational molding, powders are preferably used having a particle size smaller than or equal to 35 mesh. The grinding may be done cryogenically, if necessary. The composition is heated within the mold as the mold is rotated. The mold is usually rotated biaxially. i.e., rotated about two perpendicular axes simultaneously. The mold is typically heated externally (generally with a forced air circulating oven). The process steps include tumbling, heating and melting of thermoplastic powder, followed by coalescence, fusion or sintering and cooling to remove the molded article.

The composition of the present invention can be processed in most commercial rotational molding machines. The oven temperature range during the heating step is from 400° F. to 800° F., preferably about 500° F. to about 700° F., and more preferably from about 575° F. to about 650° F.

After the heating step the mold is cooled. The part must be cooled enough to be easily removed from the mold and retain its shape. Preferably the mold is removed from the oven while continuing to rotate. Cool air is first blown on the mold. The air can be an ambient temperature. After the air has started to cool the mold for a controlled time period, a water spray can be used. The water cools the mold more rapidly. The water used can be at cold tap water temperature, usually from about 4° C. (40° F.) to about 16° C. (60° F.). After the water cooling step, another air cooling step may optionally be used. This is usually a short step during which the equipment dries with heat removed during the evaporation of the water.

The heating and cooling cycle times will depend on the equipment used and the article molded. Specific factors include the part thickness in the mold material. Typical conditions for an ⅛ inch thick part in a steel mold are to heat the mold in the oven with air at about 316° C. (600° F.) for about 15 minutes. The part is then cooled in ambient temperature forced air for about 8 minutes and then a tap water spray at about 10° C. (50° F.) for about 5 minutes. Optionally, the part is cooled in ambient temperature forced air for an additional 2 minutes.

During the heating and cooling steps the mold containing the molded article is continually rotated. Typically this is done along two perpendicular axes. The rate of rotation of the mold about each axis is limited by machine capability and the shape of the article being molded. A typical range of operation which can be used with the present invention is to have the ratio of rotation of the major axis to the minor axis of about 1:8 to 10:1 with a range of from 1:2 to 8:1 being preferred.

Rotational molded articles of the present invention can be used where durability is essential in the sense that there is crack and puncture resistance. Examples of articles which can be made include gasoline tanks, large trash containers, and large bins or silos for fertilizer, etc.

EXAMPLES

Useful physical property determinations made on the novel interpolymer compositions described herein include:

Molecular Weight Distribution: measured by gel permeation chromatography (GPC) on a Waters 150° C. high temperature chromatographic unit equipped with three mixed porosity columns (Polymer Laboratories $10^3$, $10^4$, $10^5$, and $10^6$), operating at a system temperature of 140° C. The solvent is 1,2,4-trichlorobenzene, from which 0.3 percent by weight solutions of the samples are prepared for injection. The flow rate is 1.0 milliliters/minute and the injection size is 200 microliters.

The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Word in *Journal of Polymer Science*, Polymer Letters, Vol. 6, (621) 1968, incorporated herein by reference) to derive the following equation:

$$M_{polyethylene} = a*(M_{polystyrene})^b.$$

In this equation, a=0.4316 and b=1.0. Weight average molecular weight, $M_w$, is calculated in the usual manner according to the following formula: $M_w = R w_i * M_i$, where $w_i$ and $M_i$ are the weight fraction and molecular weight, respectively, of the ith fraction eluting from the GPC column.

For the interpolymer fractions and whole interpolymers described herein, the term "narrow molecular weight distribution" means that the $M_w/M_n$ of the interpolymer (or fraction) is less than about 3, preferably from about 2 to about 3. The $M_w/M_n$ of the "narrow molecular weight distribution" interpolymer (or fraction) can also be described by the following equation:

$$(M_w/M_n) \leq (I_{10}/I_2) - 4.63.$$

For the interpolymer fractions and whole interpolymers described herein, the term "broad molecular weight distribution" means that the $M_w/M_n$ of the interpolymer (or fraction) is greater than about 3, preferably from about 3 to about 5.

Crystallization Onset Temperature Measurement: measured using differential scanning calorimetry (DSC). Each sample to be tested is made into a compression molded plaque according to ASTM D 1928. The plaques are then thinly sliced at room temperature using a Reichert Microtome or a razor blade to obtain samples having a thickness of about 15 micrometers. About 5 milligrams of each sample to be tested is placed in the DSC pan and heated to about 180° C., held at that temperature for 3 minutes to destroy prior heat history, cooled to −50° C. at rate of 10° C./minute and held at that temperature for 2 minutes. The crystallization onset temperature and the peak temperature are recorded by the DSC as the temperature at which crystallization begins and the temperature at which the sample is as fully crystallized as possible, respectively, during the cooling period from 180° C. to −50° C.

Melt flow ratio (MFR): measured by determining "$I_{10}$" (according to ASTM D-1238, Condition 190° C./10 kg (formerly known as "Condition (N)") and dividing the obtained $I_{10}$ by the $I_2$. The ratio of these two melt index terms is the melt flow ratio and is designated as $I_{10/I_2}$. For the homogeneous portion of the interpolymer composition, the $I_{10}/I_2$ ratio is generally greater than or equal to 5.63 and preferably from about 5.8 to about 8.5. For the heterogeneous portion of the interpolymer composition, the $I_{10}/I_2$ ratio is typically from about 6.8 to about 9.5. The $I_{10}/I_2$ ratio for the whole interpolymer compositions is typically from about 6.8 to about 10.5.

1 and 2% Secant Modulus for bar samples: using a method similar to ASTM D 882, incorporated herein by reference, except that 4 specimens are used, a 4 inch gauge length is used and the conditioning period is 24 hours;

Clarity: measured by specular transmittance according to ASTM D 1746, except that the samples are conditioned for 24 hours;

Haze: measured according to ASTM D 1003, incorporated herein by reference;

Young's modulus, yield strength and elongation, break strength and elongation, and toughness: using a method similar to ASTM D 882, except that 4 specimens are used and are pulled at 20 inches per minute using a 2 inch gauge length;

Spencer Impact: using a method similar to ASTM D 3420, procedure "B", incorporated herein by reference, except that the maximum capacity is 1600 grams, the values are normalized for sample thickness and the conditioning period has been shortened from 40 hours to 24 hours; and Tensile Tear: using a method similar to ASTM D 1938, incorporated herein by reference, except that 4 specimens are used.

Notched Izod Impact test ("NI", ASTM D256) indicates the energy required to break notched specimens under standard conditions. For MDPE and HDPE, NI can vary from about 0.5 to about 20 ft.lb/in, depending on the exact composition and temperature of the test. Typically, values between 0.5 and 4 ft.lb/in correspond to a brittle failure, while values above 6 ft.lb/in correspond to a ductile failure. A ductile failure mode involves more energy absorption due to the energy required to yield and stretch the material. The impact energy concentrated at the tip of the notch has to find a way to be dissipated, at a very high rate of deformation. If the material contains rubbery material that can elastically absorb energy through the interfaces with the harder matrix. the initiated crack (the notch is actually the initiation of the crack) will propagate as a yield and stretch mechanism. If that is not the case, and the material is so stiff that cannot elongate, the failure will be brittle.

Example 1

Homogeneous Catalyst Preparation

A known weight of the constrained-geometry organometallic complex $[\{(CH_3)_4C_5)\}—(CH_3)_2Si—N—(t-C_4H_9)]Ti(CH_3)_2$ was dissolved in Isopar E to give a clear solution with a concentration of Ti of 0.005M. A similar solution of the activator complex, tris(perfluoropheny)borane (0.010M) was also prepared. A catalyst composition of a few mL total volume was prepared by adding 2.0 mL of Isopar E solution of Ti reagent, 2.0 mL of the borane (for B:Ti=2:1) and 2 mL Isopar E to a 4 oz glass bottle. The solution was mixed for a few minutes and transferred by syringe to a catalyst injection cylinder on the polymerization reactor.

Heterogeneous Catalyst Preparation

A heterogeneous Ziegler-type catalyst was prepared substantially according to U.S. Pat. No. 4,612,300 (Ex. P.), by sequentially adding to a volume of Isopar E, a slurry of anhydrous magnesium chloride in Isopar E, a solution of EtAlCl$_2$ in hexane, and a solution of Ti(O-iPr)$_4$ in Isopar E, to yield a composition containing a magnesium concentration of 0.17M and a ratio of Mg/Al/Ti of 40/12/3. An aliquot of this composition containing 0.064 mmol of Ti which was treated with a dilute solution of Et$_3$Al to give an active catalyst with a final Al/Ti ratio of 8/1. This slurry was then transferred to a syringe until it was required for injection into the polymerization reactor.

Polymerization

The polymerization described in this example demonstrates a process for the use of two catalysts, employed sequentially, in two polymerization reactors. A stirred, one-gallon (3.79 L) autoclave reactor is charged with 2.1 L of Isopar™ E (made by Exxon Chemical) and 388 mL of 1-octene comonomer and the contents are heated to 150° C. The reactor is next charged with ethylene sufficient to bring the total pressure to 450 psig. A solution containing 0.010 mmol of the active organometallic catalyst described in the catalyst preparation section is injected into the reactor using a high pressure nitrogen sweep. The reactor temperature and pressure are maintained constant at the desired final pressure and temperature by continually feeding ethylene during the polymerization run and cooling the reactor as necessary. After a 10 minute reaction time, the ethylene is shut off and the reactor is depressured to 100 psig. Hydrogen is admitted to the reactor and the contents heated. A slurry of the heterogeneous catalyst containing 0.0064 mmol Ti prepared as described in the catalyst preparation section is injected into the reactor using a high pressure nitrogen sweep. The reactor is then continually fed ethylene at 450 psig and the reaction temperature quickly rose to 185° C. where the polymerization is sustained for an additional 10 minutes. At this time the reactor is depressured and the hot polymer-containing solution transferred into a nitrogen-purged resin kettle containing 0.2 g Irganox 1010 antioxidant as a stabilizer. After removal of all the solvent in vacuo, the sample is then weighed (yield 270 g) to determine catalyst efficiencies (344300 g PE/g Ti).

Examples 2 and 3

Examples 2 and 3 are carried out as in Example 1 except using the catalyst amounts and reactor temperatures described in Table 1. The overall catalyst efficiencies are also shown in the Table.

The polymer products of Examples 1–3 are tested for various structural, physical and mechanical properties and the results are given in Tables 2, 2A and 2B. Comparative Example A is Attane® 4001 polyethylene and comparative example B is Attane® 4003. Both comparative examples are made by The Dow Chemical Company and are commercial ethylene-octene copolymers produced under solution process conditions using a typical commercial Ziegler-type catalyst. The data show the polymers of the invention have more narrow molecular weight distributions ($M_w/M_n$), higher melting points, better crystallization properties (i.e., higher crystallization onset temperatures) and, surprisingly, higher modulus than the commercial comparative examples A and B. The polymers of the invention surprisingly also show better optical properties (i.e., higher clarity and lower haze) than the comparative polymers, even though the polymers have about the same density. In addition, the polymers of the invention show better strength, toughness, tear and impact properties.

TABLE 1

Process Conditions for Reactor #1 for Examples 1–3

| Ex. | Monomer Volume (ml) | Reactor #1 Temp. (° C.) | H$_2$ (Reactor #1) (mmol) | Catalyst #1 (micromoles) |
|---|---|---|---|---|
| 1 | 300 | 154 | 0 | 10 |
| 2 | 300 | 141 | 0 | 5 |
| 3 | 300 | 134 | 0 | 4 |

TABLE 1A

Process Conditions for Reactor #2 for Examples 1–3

| Ex. | Monomer Volume (ml) | Reactor #2 Temp. (° C.) | H$_2$ (Reactor #2) (mmol) | Catalyst #2 (micromoles) | Overall Titanium Efficiency (g PE/g Ti) |
|---|---|---|---|---|---|
| 1 | 300 | 185 | 100 | 6.4 | 344300 |
| 2 | 300 | 191 | 100 | 9 | 410100 |
| 3 | 300 | 193 | 100 | 9 | 425600 |

TABLE 2

Examples 1–3 and Comparative Examples A and B

| Ex. | Density (g/cm$^3$) | Melt Index (I$_2$) (g/10 min) | MFR (I$_{10}$/I$_2$) | $M_w$ | $M_n$ | MWD ($M_w/M_n$) |
|---|---|---|---|---|---|---|
| A | 0.9136 | 1.06 | 8.33 | 122500 | 32500 | 3.77 |
| B | 0.9067 | 0.79 | 8.81 | 135300 | 31900 | 4.25 |
| 1 | 0.9112 | 1.07 | 7.4 | 115400 | 40000 | 2.89 |
| 2 | 0.9071 | 1.23 | 7.32 | 117600 | 40300 | 2.92 |
| 3 | 0.9062 | 1.08 | 7.46 | 124500 | 40100 | 3.1 |

TABLE 2A

| Ex. | Melting Temp. (° C.) | Crystl. Onset Temp. (° C.) | 2% Secant Modulus | Young's Modulus (psi) | Clarity (specular trans.) | Haze (%) |
|---|---|---|---|---|---|---|
| A | 121 | 105 | 20389 | 20425 | 0.85 | 67 |
| B | 121 | 105 | 13535 | 13541 | 1.32 | 56 |
| 1 | 124 | 111 | 25634 | 25696 | 2.7 | 65 |
| 2 | 123 | 111 | 28144 | 28333 | 5.5 | 62 |
| 3 | 123 | 111 | 28650 | 28736 | 3.7 | 61 |

TABLE 2B

| Ex. | Yield Strength (psi) | Yield Elongation (%) | Break Strength (psi) | Break Elongation (%) | Toughness (ft.-lb.) | Spencer Impact (psi) | Tensile Strength (g/mil) |
|---|---|---|---|---|---|---|---|
| A | 1370 | 22 | 3133 | 693 | 1003 | 847 | 265 |
| B | 1108 | 24 | 2450 | 667 | 793 | 688 | 215 |
| 1 | 1541 | 16 | 4134 | 642 | 1155 | 897 | 311 |
| 2 | 1717 | 16 | 5070 | 658 | 1327 | 908 | 290 |
| 3 | 1756 | 15 | 4679 | 637 | 1234 | 903 | 311 |

Example 4

Homogeneous Catalyst Preparation

A known weight of the constrained-geometry organometallic complex [{(CH$_3$)$_4$C$_5$) }—(CH$_3$)$_2$Si—N—(C$_4$H$_9$)]Ti(CH$_3$)$_2$ is dissolved in Isopar E to give a clear solution with a concentration of Ti of 0.0001M. A similar solution of the activator complex, tris(perfluoropheny)borane (0.002M) is also prepared. A catalyst composition of a few mL total volume is prepared by adding 1.5 mL of Isopar E solution of Ti reagent, 1.5 mL of the borane (for B:Ti=2:1) and 2 mL of a heptane solution of methylaluminoxane (obtained commercially from Texas Alkyls as MMAO Type 3A) containing 0.015 mmol Al to a 4 oz glass bottle. The solution is mixed for a few minutes and transferred by syringe to a catalyst injection cylinder on the polymerization reactor.

Heterogeneous Catalyst Preparation

A heterogeneous Ziegler-type catalyst is prepared similarly to that in Ex. 1 to give an active catalyst containing 0.009 mmol Ti and a final Al/Ti ratio of 8/1. This slurry is then transferred to a syringe in preparation for addition to the catalyst injection cylinder on the polymerization reactor.

Polymerization

A stirred, one-gallon (3.79 L) autoclave reactor is charged with 2.1 L of Isopar™ E (made by Exxon Chemical) and 168 mL of 1-octene comonomer and the contents are heated to 120° C. The reactor is next charged with hydrogen and then with ethylene sufficient to bring the total pressure to 450 psig. A solution containing 0.0015 mmol of the active organometallic catalyst described in the catalyst preparation section is injected into the reactor using a high pressure nitrogen sweep. The reactor temperature and pressure are maintained at the initial run conditions. After a 10 minute reaction time, the ethylene is shut off and the reactor is depressured to 100 psig. At this time, an additional 168 mL of 1-octene is added to the reactor along with additional hydrogen and the contents heated. A slurry of the heterogeneous catalyst containing 0.009 mmol Ti prepared as described in the catalyst preparation section is injected into the reactor using a high pressure nitrogen sweep. The reactor is then continually fed ethylene at 450 psig and the reaction temperature quickly rises to 189° C. where the polymerization is sustained for an additional 10 minutes. At this time the reactor is depressured and the hot polymer-containing solution transferred into a nitrogen-purged resin kettle containing 0.2 g Irganox™ 1010 (a hindered phenolic antioxidant made by Ciba Geigy Corp.) as a stabilizer. After removal of all the solvent in vacuo, the sample is then weighed (yield 202 g) to determine catalyst efficiencies (401630 g PE/g Ti).

Examples 5–7

Examples 5–7 are carried out as in Example 4 except using the catalysts described in Example 1 and the catalyst amounts and reactor conditions described in Tables 3 and 3A. The overall catalyst efficiencies are also shown in Tables 3 and 3A.

These examples show that the reaction conditions can be readily controlled to vary the composition and molecular weight distribution of the polymer through a simple change in catalyst amounts and monomer concentrations. Table 4 shows that the interpolymers produced in these examples have a broader molecular weight distribution than those of the earlier examples demonstrating a unique feature of the process control. The physical and mechanical properties still show surprising enhancements over typical commercial copolymers of comparable molecular weight and composition, particularly in strength, impact and tear properties. Comparing examples 4 and 5 with comparative example A (as well as by comparing examples 6 and 7 with comparative example B) shows that the crystallization properties of the polymers of the invention are largely unaffected by broadening the $M_w/M_n$.

TABLE 3

Process Conditions for Reactor #1 for Examples 4–7

| Ex. | Monomer Volume (ml) | Reactor #1 Temp. (° C.) | Reactor #1 $H_2$ | Catalyst #1 (micromoles) | Overall Titanium Efficiency (g PE/g Ti) |
|---|---|---|---|---|---|
| 4 | 150 + 150 | 123 | 10 | 1.5 | 401630 |
| 5 | 150 + 150 | 139 | 50 | 5 | 422670 |
| 6 | 300 + 150 | 122 | 0 | 4 | 337241 |
| 7 | 300 + 150 | 133 | 100 | 6 | 434933 |

TABLE 3A

Process Conditions for Reactor #2 for Examples 4–7

| Ex. | Monomer Volume (ml) | Reactor #2 Temp. (° C.) | Reactor #2 $H_2$ (mmol) | Catalyst #2 (micromoles) | Overall Titanium Efficiency (g PE/g Ti) |
|---|---|---|---|---|---|
| 4 | 150 + 150 | 189 | 300 | 9 | 401630 |
| 5 | 150 + 150 | 194 | 50 | 7.2 | 422670 |
| 6 | 300 + 150 | 189 | 400 | 9 | 337241 |
| 7 | 300 + 150 | 188 | 50 | 7.2 | 434933 |

TABLE 4

Interpolymer Properties

| Ex. | Density (g/cm³) | Melt Index ($I_2$) (g/10 min) | MFR ($I_{10}/I_2$) | $M_w$ | $M_n$ | MWD ($M_w/M_n$) |
|---|---|---|---|---|---|---|
| A | 0.9136 | 1.06 | 8.33 | 122500 | 32500 | 3.77 |
| 4 | 0.913 | 1.12 | 7.45 | 117900 | 29400 | 4.003 |
| 5 | 0.9136 | 1.17 | 8.07 | 135000 | 42100 | 3.209 |
| B | 0.9067 | 0.79 | 8.81 | 135300 | 31900 | 4.25 |
| 6 | 0.9108 | 3.3 | 7.4 | 89700 | 28700 | 3.122 |
| 7 | 0.9081 | 1.53 | 10.17 | 125700 | 31000 | 4.057 |

TABLE 4A

| Ex. | Melting peak (° C.) | Cryst. Onset Temp. (° C.) | Young's Modulus (psi) | 2% Secant Modulus | Clarity (specular trans.) | Haze (%) |
|---|---|---|---|---|---|---|
| A | 121 | 105 | 20425 | 20389 | 0.85 | 67 |
| 4 | 123 | 110 | 20333 | 20292 | 4.7 | 72 |
| 5 | 123 | 110 | 22648 | 22609 | 2.32 | 72 |
| B | 121 | 105 | 13541 | 13535 | 1.32 | 56 |
| 6 | 124 | 112 | 20100 | 20074 | 1.15 | 72 |
| 7 | 123 | 112 | 19836 | 19800 | 1.85 | 67 |

TABLE 4B

| Ex. | Yield strength (psi) | Yield elongation (%) | Break strength (psi) | Break elongation (%) | Toughness (ft-lbs) | Spencer Impact (psi) | Tensile Tear (g/mil) |
|---|---|---|---|---|---|---|---|
| A | 1370 | 22 | 3133 | 693 | 1003 | 847 | 265 |
| 4 | 1468 | 19 | 3412 | 671 | 1012 | 977 | 271 |
| 5 | 1659 | 16 | 3608 | 738 | 1224 | 994 | 313 |
| B | 1108 | 24 | 2450 | 667 | 793 | 688 | 215 |
| 6 | 1354 | 16 | 2737 | 670 | 885 | 1022 | 255 |
| 7 | 1326 | 21 | 2353 | 729 | 914 | 821 | 238 |

Example 8

Homogeneous Catalyst Preparation

A known weight of the constrained-geometry organometallic complex $[\{(CH_3)_4C_5)\}-(CH_3)_2Si-N-(t-C_4H_9)]Ti(CH_3)_2$ is dissolved in Isopar E to give a clear solution with a concentration of Ti of 0.001M. A similar solution of the activator complex, tris(perfluoropheny)borane (0.002M) is also prepared. A catalyst composition of a few mL total volume is prepared by adding 1.5 mL of Isopar E solution of Ti reagent, 1.5 mL of the borane (for B:Ti=2:1) and 2 mL of a heptane solution of methylaluminoxane (obtained commercially from Texas Alkyls as MMAO) containing 0.015 mmol Al to a 4 oz glass bottle. The solution is mixed for a few minutes and transferred by syringe to a catalyst injection cylinder on the polymerization reactor.

Heterogeneous Catalyst Preparation

A heterogeneous Ziegler-type catalyst is prepared similarly to that in Ex. 1 to give an active catalyst containing 0.009 mmol Ti and a final Al/Ti ratio of 8/1. This slurry is then transferred to a syringe in preparation for addition to the catalyst injection cylinder on the polymerization reactor.

Polymerization

The polymerization described in this example demonstrates a process for the use of two catalysts, employed sequentially, in two polymerization reactors. A stirred, one-gallon (3.79 L) autoclave reactor is charged with 2.1 L of Isopar™ E (made by Exxon Chemical) and 168 mL of 1-octene comonomer and the contents are heated to 120° C. The reactor is next charged with hydrogen and then with ethylene sufficient to bring the total pressure to 450 psig. A solution containing 0.0015 mmol of the active organometallic catalyst described in the catalyst preparation section is injected into the reactor using a high pressure nitrogen sweep. The reactor temperature and pressure are maintained at the initial run conditions. After a 10 minute reaction time, the ethylene is shut off and the reactor is depressured to 100 psig. At this time, an additional 168 mL of 1-octene is added to the reactor along with additional hydrogen and the contents heated. A slurry of the heterogeneous catalyst containing 0.009 mmol Ti prepared as described in the catalyst preparation section is injected into the reactor using a high pressure nitrogen sweep. The reactor is then continually fed ethylene at 450 psig and the reaction temperature quickly rises to 189° C. where the polymerization is sustained for an additional 10 minutes. At this time the reactor is depressured and the hot polymer-containing solution transferred into a nitrogen-purged resin kettle containing 0.2 g Irganox™ 1010 (a hindered phenolic antioxidant made by Ciba Geigy Corp.) as a stabilizer. After removal of all the solvent in vacuo, the sample is then weighed (yield 202 g) to determine catalyst efficiencies (401630 g PE/g Ti).

Examples 9–14

Examples 9–14 are carried out as in Example 8 except using the catalysts described in Example 1 and the catalyst amounts and reactor conditions described in Tables 5 and 5A. The overall catalyst efficiencies are also shown in the Tables.

These examples show the ability to readily control the reaction conditions to vary the composition and molecular weight distribution of the polymer through a simple change in catalyst amounts and monomer concentrations. The polymers produced in these Examples show a broader molecular weight distribution than those of the earlier examples showing a unique feature of the process control. The physical and mechanical properties still show surprising enhancements over typical commercial copolymers of comparable molecular weight and composition, particularly in strength, impact and tear properties.

Comparative Example C is Dowlex® 2045, a commercial ethylene/1-octene copolymer made by The Dow Chemical Company. Comparative Example D is Dowlex® 2047, a commercial LLDPE ethylene/1-octene copolymer made by The Dow Chemical Company.

The data in Table 6 show that the molecular weight distribution ($M_w/M_n$) can surprisingly remain relatively low, demonstrating a unique feature of the process control of the invention.

TABLE 5

Process Conditions for Reactor #1 for Examples 8–14

| Ex. | Monomer Volume (ml) | Reactor #1 Temp (° C.) | Reactor #1 $H_2$ (mmol) | Catalyst #1 (micromoles) | Overall Titanium Efficiency (g PE/g Ti) |
|---|---|---|---|---|---|
| 8 | 155 | 158 | 25 | 12.5 | 286100 |
| 9 | 155 | 146 | 20 | 7.5 | 312400 |
| 10 | 155 | 156 | 0 | 7.5 | 326600 |
| 11 | 205 | 155 | 0 | 10 | 311900 |
| 12 | 230 | 149 | 0 | 7.5 | 312400 |
| 13 | 155 | 152 | 0 | 7.5 | 305300 |
| 14 | 150 + 150 | 145 | 0 | 7.5 | 298200 |

TABLE 5A

Process Conditions for Reactor #2 for Examples 8–14

| Ex. | Monomer Volume (ml) | Reactor #2 Temp (° C.) | Reactor #2 $H_2$ (mmol) | Catalyst #2 (micromoles) | Overall Titanium Efficiency (g PE/g Ti) |
|---|---|---|---|---|---|
| 8 | 155 | 190 | 150 | 7.2 | 286100 |
| 9 | 155 | 170 | 150 | 7.2 | 312400 |
| 10 | 155 | 188 | 200 | 7.2 | 326600 |
| 11 | 205 | 194 | 150 | 7.2 | 311990 |
| 12 | 230 | 194 | 150 | 7.2 | 312400 |
| 13 | 155 | 196 | 400 | 7.2 | 305300 |
| 14 | 150 + 150 | 195 | 150 | 7.2 | 298200 |

TABLE 6

| Ex. | Density (g/cm$^3$) | Melt Index ($I_2$) (g/10 min) | MFR ($I_{10}/I_2$) | $M_w$ | $M_n$ | MWD ($M_w/M_n$) |
|---|---|---|---|---|---|---|
| C | 0.9202 | 1 | ND | 110000 | 27300 | 4.03 |
| 8 | 0.9257 | 3.1 | 6.72 | 80400 | 32000 | 2.5 |
| 9 | 0.9225 | 1.43 | 6.89 | 99400 | 36800 | 2.7 |
| 10 | 0.9234 | 1.57 | 7.04 | 100400 | 35200 | 2.85 |
| D | 0.9171 | 2.3 | ND | 85500 | 22000 | 3.89 |
| 11 | 0.9158 | 1.39 | 7.15 | 100000 | 35100 | 2.85 |
| 12 | 0.916 | 0.91 | 7.16 | 113200 | 37700 | 3 |
| 13 | 0.915 | 0.84 | 7.94 | 106900 | 33300 | 3.21 |
| 14 | 0.9186 | 1.09 | 7.1 | 106200 | 36400 | 2.9 |

ND = Not Determined

TABLE 6A

| Ex. | Melt. Peak (° C.) | Crystal. Onset Temp. (° C.) | 2% Secant Modulus | Young's Modulus (psi) | Clarity (Specular Trans.) | Haze (%) |
|---|---|---|---|---|---|---|
| C | ND | 107 | 29169 | 29253 | 3.55 | 55 |
| 8 | 123 | 111 | 48123 | 48209 | 0.15 | 75 |
| 9 | 124 | 111 | 47815 | 47906 | 0.72 | 78 |
| 10 | 124 | 114 | 34077 | 34742 | 0.15 | 72 |
| D | ND | ND | 26094 | 26094 | 1.22 | 49 |
| 11 | 124 | 113 | 26245 | 26304 | 0.22 | 69 |
| 12 | 123 | 111 | 35492 | 35599 | 0.47 | 67 |
| 13 | 122 | 110 | 26466 | 26534 | 1.37 | 63 |
| 14 | 124 | 111 | 34989 | 35032 | 0.77 | 66 |

ND = Not Determined

TABLE 6B

| Ex. | Yield Strength (psi) | Yield elongation (%) | Break strength (psi) | Break elongation (%) | Toughness (ft-lb) | Spencer Impact (psi) | Tensile Tear (g/mil) |
|---|---|---|---|---|---|---|---|
| C | 1830 | 13 | 4395 | 689 | 1292 | 735 | 316 |
| 8 | 2628 | 12 | 3893 | 620 | 1335 | 992 | 450 |
| 9 | 2403 | 13 | 4375 | 613 | 1343 | 753 | 367 |
| 10 | 2240 | 13 | 3619 | 600 | 1179 | 1043 | 326 |
| D | 1600 | 15 | 4061 | 771 | 1351 | 716 | 285 |
| 11 | 1905 | 15 | 5079 | 700 | 1480 | 820 | 334 |
| 12 | 2043 | 15 | 5385 | 610 | 1404 | 976 | 336 |
| 13 | 1818 | 21 | 4504 | 612 | 1203 | 977 | 247 |
| 14 | 1933 | 16 | 4755 | 653 | 1332 | 741 | 283 |

In step (B) of the Second Process, the ethylene and α-olefin materials may be present as unreacted materials in the reaction product from step (A) or they can each be added to the polymerization reaction mixture in step (B) as needed to make the desired interpolymer. In addition, hydrogen or other telogen can be added to the polymerization mixture of step (B) to control molecular weight.

Examples 15–31 and Comparative Examples E–T

For the blends of Examples 15–31 and Comparative Examples E–T the following components were used:

Homogeneous Interpolymer Blend Components

Affinity™ FM 1570 is a product and registered trademark of The Dow Chemical Company and has a melt index (I2) of 1.00 g/10 min, an I10/I2 of 10.50 and a density of 0.915 g/cm³.

Affinity™ PL 1840 is a product and registered trademark of The Dow Chemical Company and has a melt index (I2) of 1.00 g/10 min, an I10/I2 of 10.00, and a density of 0.909 g/cm³.

Affinity™ PL 1880 is a product and registered trademark of The Dow Chemical Company and has a melt index (I2) of 1.00 g/I10 min, an I10/I2 of 9.00, and a density of 0.902 g/cm³.

Affinity™ DPL 1842.00 is a product and registered trademark of The Dow Chemical Company and has a melt index (I2) of 1.00 g/10 min, an I10/I2 of 10.00, and a density of 0.909 g/cm³.

Affinity™ EG8 100 is a product and registered trademark of The Dow Chemical Company and has a melt index (I2) of 1.00 g/10 min, an I10/I2 of 7.60, and a density of 0.870 g/cm³.

Affinity™ VP 8770 is is a product and registered trademark of The Dow Chemical Company and has a melt index (I2) of 1.00 g/10 min, an I10/I2 of 7.60, and a density of 0.870 g/cm³.

Heterogeneous Polymer Blend Components

Dowlex™ 2045is a product and registered trademark of The Dow Chemical Company and has a melt index (I2) of 1.00 g/10 min, an I10/I2 of 8.00 and a density of 0.920 g/cm³.

Dowlex™ 2027A is a product and registered trademark of The Dow Chemical Company and has a melt index (I2) of 4.00 g/10 min, an I10/I2 of 6.80 and a density of 0.941 g/cm³.

Dowlex™ 2038 is a product and registered trademark of The Dow Chemical Company and has a melt index (I2) of 1.00 g/10 min, an I10/I2 of 7.40 and a density of 0.935 g/cm³.

Dowlex™ 2431C is a product and registered trademark of The Dow Chemical Company and has a melt index (I2) of 7.00 g/10 min, an I10/I2 of 7.00, and a density of 0.935 g/cm³.

Dowlex™ 2429C is a product and registered trademark of The Dow Chemical Company and has a melt index (I2) of 4.00 g/10 min, an I10/I2 of 7.40, and a density of 0.935 g/cm³.

NG 2429N is a product of The Dow Chemical Company and has a melt index (I2) of 4.00 g/10 min and a density of 0.935 g/cm³.

NG 2431N is a product of The Dow Chemical Company and has a melt index (I2) of 7.00 g/10 min and a density of 0.935 g/cm³.

NG 2432N is a product of The Dow Chemical Company and has a melt index (I2) of 4.00 g/10 min and a density of 0.939 g/cm³.

HDPE 04452N is a product of The Dow Chemical Company and has a melt index (I2) of 4.00 g/10 min and a density of 0.952 g/cm³.

HDPE 05862N is a product of The Dow Chemical Company and has a melt index (I2) of 5.00 g/10 min and a density of 0.962 g/cm³.

HDPE 08454N is a product of The Dow Chemical Company and has a melt index (I2) of 7.00 g/10 min, an I10/I2 of 7.40, and a density of 0.954 g/cm³.

For the blend compositions in Tables 9–12, typically after Components A and B are initially selected, then the additional Component(s) C (and sometimes D) if required, are selected to achieve the target final blend melt index and density. First the components of each blend were tumble blended for sufficient time to insure a homogeneous distribution of the components. The dry blends were subsequently melt blended. The following Examples and Comparative Examples from Tables 9 and 11 were melt blend compounded on a 1.5" NRM, single screw extruder: Example 15, Example 17, Example 18, Example 19, Example 21, Example 23, Example 25, Example 26, Example 27, Example 29, Example 30, Comparative E, Comparative F, Comparative S and Comparative T. The Set Point conditions for the NRM are listed below in Table 7. The output rate was approximately 70–100 pounds/hour and the melt temperature was 381 F.

TABLE 7

Set Point Conditions for 1.5" NRM, Single Screw Extruder

| | |
|---|---|
| Feeder | 365° F. |
| Zone 1 ° C. | 365° F. |
| Zone 2 | 365° F. |
| Zone 3 | 365° F. |
| Zone 4 | 365° F. |
| Zone 5 | 365° F. |
| Zone 6 | 365° F. |
| Zone 7 | 365° F. |
| Die Temperature | 365° F. |
| Screw Speed | 65 RPM |
| Melt Temperature (Actual) | 338° F. |

The remainder of the Examples and Comparative Examples in Tables 9 and 11 were melt blend compounded on a Haake Rheocord 300p/Rheomex PTW25p 25 mm twin screw extruder. The Set Point conditions for the Haake twin screw extruder are listed below in Table 8. The output rate was approximately 10 pounds/hour and the melt temperature was 338 F.

TABLE 8

Set Point Conditions for 1.5" NRM, Single Screw Extruder

| | |
|---|---|
| Barrel Zone 1 | 275° F. |
| Barrel Zone 2 | 325° F. |
| Barrel Zone 3 | 350° F. |
| Barrel Zone 4 | 350° F. |
| Die Zone 3 | 350° F. |
| Die Zone 2 | 350° F. |
| Die Zone 1 | 350° F. |
| Screw Speed | 50 RPM |
| Die Temperature | 350° F. |
| Melt Temperature | 381° F. |

The various blend compositions and properties are summarized in Tables 9 to 12.

TABLE 9

| Description | Example 15 | Example 16 | Example 17 | Example 18 | Example 19 | Example 20 |
|---|---|---|---|---|---|---|
| Resin A | EG 8100 | VP 8770 | PL 1880 | EG 8100 | VP 8770 | PL 1880 |
| Wt % A | 0.1500 | 0.1500 | 0.1500 | 0.1500 | 0.2000 | 0.1890 |
| Density A | 0.8700 | 0.8850 | 0.9020 | 0.8700 | 0.8850 | 0.9020 |
| I2 A | 1.00 | 1.00 | 1.00 | 1.00 | 1.00 | 1.00 |
| Volume Fraction A | 0.1613 | 0.1586 | 0.1554 | 0.1618 | 0.2127 | 0.1973 |
| Resin B | HDPE 08454N | Dowlex 2429C | Dowlex 2429C | Dowlex 2038 | Dowlex 2038 | Dowlex 2038 |
| Wt % B | 0.0851 | 0.0372 | 0.1872 | 0.2669 | 0.2224 | 0.1501 |
| Density B | 0.9540 | 0.9350 | 0.9350 | 0.9350 | 0.9350 | 0.9350 |
| I2 B | 7.00 | 4.00 | 4.00 | 1.00 | 1.00 | 1.00 |
| Resin C | Dowlex 2431C | Dowlex 2431C | Dowlex 2431C | HDPE 04452N | HDPE 04452N | HDPE 04452N |
| Wt % C | 0.2865 | 0.3716 | 0.3716 | 0.0995 | 0.0594 | 0.6610 |
| Density C | 0.9350 | 0.9350 | 0.9350 | 0.9520 | 0.9520 | 0.9520 |
| I2 C | 7.00 | 7.00 | 7.00 | 4.00 | 4.00 | 4.00 |
| Resin D | HDPE 04452N | HDPE 04452N | HDPE 04452N | HDPE 05862N | HDPE 05862N | |
| Wt % D | 0.4784 | 0.4412 | 0.2912 | 0.4836 | 0.5181 | |
| Density D | 0.9520 | 0.9520 | 0.9520 | 0.9620 | 0.9620 | |
| I2 D | 4.0000 | 4.0000 | 4.0000 | 5.0000 | 5.0000 | |
| Final Density | 0.9356 | 0.9357 | 0.9346 | 0.9387 | 0.9410 | 0.9419 |
| Final I2 | 3.42 | 3.89 | 3.97 | 2.30 | 2.54 | 2.62 |
| Final I10/I2 | 8.50 | 7.51 | 7.43 | 7.91 | 7.45 | 7.20 |
| Description | Example 21 | Example 22 | Example 23 | Example 24 | Example 25 | Example 26 |
| Resin A | EG 8100 | PL 1880 | VP 8770 | PL 1880 | EG 8100 | VP 8770 |
| Wt % A | 0.2066 | 0.2075 | 0.2075 | 0.1498 | 0.0963 | 0.1791 |
| Density A | 0.8700 | 0.9020 | 0.8850 | 0.9020 | 0.8700 | 0.8850 |
| I2 A | 1.00 | 1.00 | 1.00 | 1.00 | 1.00 | 1.00 |
| Volume Fraction A | 0.2232 | 0.2165 | 0.2201 | 0.1563 | 0.1041 | 0.1907 |
| Resin B | Dowlex 2038 | Dowlex 2027A | Dowlex 2038 | Dowlex 2027A | Dowlex 2027A | HDPE 04452N |
| Wt % B | 0.1108 | 0.1476 | 0.0422 | 0.4101 | 0.3697 | 0.8209 |
| Density B | 0.9350 | 0.9410 | 0.9350 | 0.9410 | 0.9410 | 0.9520 |
| I2 B | 1.00 | 4.00 | 1.00 | 4.00 | 4.00 | 4.00 |
| Resin C | HDPE 05862N | HDPE 04452N | HDPE 04452N | HDPE 04452N | HDPE 04452N | |
| Wt % C | 0.6826 | 0.6448 | 0.4883 | 0.4401 | 0.5340 | |
| Density C | 0.9620 | 0.9520 | 0.9520 | 0.9520 | 0.9520 | |
| I2 C | 5.00 | 4.00 | 4.00 | 4.00 | 4.00 | |
| Resin D | | | HDPE 05862N | | | |
| Wt % D | | | 0.2620 | | | |
| Density D | | | 0.9620 | | | |
| I2 D | | | 5.0000 | | | |
| Final Density | 0.9396 | 0.9408 | 0.9387 | 0.9413 | 0.9406 | 0.9425 |
| Final I2 | 3.07 | 3.15 | 3.30 | 3.30 | 3.77 | 3.45 |
| Final I10/I2 | 7.50 | 7.06 | 7.22 | 7.00 | 6.99 | 7.44 |

TABLE 9-continued

| Description | Example 27 | Example 28 | Example 29 | Example 30 | Example 31 |
|---|---|---|---|---|---|
| Resin A | VP 8770 | PL 1880 | EG 8100 | VP 8770 | PL 1880 |
| Wt % A | 0.0963 | 0.0963 | 0.1192 | 0.1192 | 0.1192 |
| Density A | 0.8850 | 0.9020 | 0.8700 | 0.8850 | 0.9020 |
| I2 A | 1.00 | 1.00 | 1.00 | 1.00 | 1.00 |
| Volume Fraction A | 0.1024 | 0.0999 | 0.1302 | 0.1280 | 0.1255 |
| Resin B | Dowlex 2027A | Dowlex 2027A | HDPE 04452N | HDPE 04452N | HDPE 04452N |
| Wt % B | 0.5012 | 0.6531 | 0.1406 | 0.2513 | 0.3769 |
| Density B | 0.9410 | 0.9410 | 0.9520 | 0.9520 | 0.9520 |
| I2 B | 4.00 | 4.00 | 4.00 | 4.00 | 4.00 |
| Resin C | HDPE 04452N | HDPE 04452N | HDPE 05862N | HDPE 08454N | HDPE 08454N |
| Wt % C | 0.4025 | 0.2506 | 0.7402 | 0.0735 | 0.1568 |
| Density C | 0.9520 | 0.9520 | 0.9625 | 0.9540 | 0.9540 |
| I2 C | 4.00 | 4.00 | 5.00 | 7.00 | 7.00 |
| Resin D |  |  |  | HDPE 05862N | HDPE 05862N |
| Wt % D |  |  |  | 0.5560 | 0.3472 |
| Density D |  |  |  | 0.9625 | 0.9625 |
| I2 D |  |  |  | 5.0000 | 5.0000 |
| Final Density | 0.9413 | 0.9408 | 0.9504 | 0.9502 | 0.9499 |
| Final I2 | 3.70 | 3.63 | 4.27 | 4.30 | 4.15 |
| Final I10/I2 | 6.90 | 6.87 | 7.27 | 7.29 | 7.49 |

TABLE 10

| Description | Example 15 | Example 16 | Example 17 | Example 18 | Example 19 | Example 20 |
|---|---|---|---|---|---|---|
| Density | 0.9356 | 0.9357 | 0.9346 | 0.9387 | 0.9410 | 0.9419 |
| I2 | 3.42 | 3.89 | 3.97 | 2.30 | 2.54 | 2.62 |
| I10/I2 | 8.50 | 7.51 | 7.43 | 7.91 | 7.45 | 7.20 |
| 1% Sec Modulus(psi) | 75500 | 77134 | 75593 | 101953 | 112178 |  |
| 2% Sec Modulus (psi) | 63171 | 64550 | 63260 | 85760 | 93944 | 101673 |
| Flex Modulus (psi) | 93864 | 97589 | 97220 | 118274 | 133755 | 133488 |
| Yield (psi) | 2335 | 2300 | 2233 | 2544 | 2660 | 2790 |
| Ultimate (psi) | 3841 | 3544 | 3855 | 4404 | 4448 | 4368 |
| % Elongation | 989 | 918 | 886 | 947 | 959 | 999 |
| Energy to Break (In-Lb) | 384 | 340 | 342 | 393 | 407 |  |
| Vicat (° C.) | 116 | 117 | 117 | 119 | 119 | 122 |
| Heat Distortion | 54.1 | 54.6 | 52.5 | 57.4 | 58.0 | 55.5 |
| Izod Impact RT (ft.lbs./in.) | 9.9 | 8.9 | 8.1 | 10.9 | 12.6 | 11.2 |
| Izod Impact 0 (ft.lbs./in.) | 7.2 | 7.8 | 4.3 | 9.9 | 11.2 | 10.5 |
| Izod Impact −20 (ft.lbs./in.) | 6.6 | 1.8 | 1.6 | 9.9 | 10.9 | 1.9 |
| Izod Impact −40 (ft.lbs./in.) |  |  |  | 1.5 |  | 1.4 |

| Description | Example 21 | Example 22 | Example 23 | Example 24 | Example 25 | Example 26 |
|---|---|---|---|---|---|---|
| Density | 0.9396 | 0.9408 | 0.9387 | 0.9413 | 0.9406 | 0.9425 |
| I2 | 3.07 | 3.15 | 3.30 | 3.30 | 3.77 | 3.45 |
| I10/I2 | 7.50 | 7.06 | 7.22 | 7.00 | 6.99 | 7.44 |
| 1% Sec Modulus(psi) | 109073 |  | 112009 |  | 103374 | 115285 |
| 2% Sec Modulus (psi) | 90851 | 100353 | 93753 | 96752 | 86119 | 95746 |
| Flex Modulus (psi) | 130763 | 130694 | 134287 | 127737 | 124082 | 140036 |
| Yield (psi) | 2688 | 2520 | 2652 | 2726 | 2716 | 2696 |
| Ultimate (psi) | 3751 | 4256 | 4310 | 4143 | 4159 | 4401 |
| % Elongation | 987 | 999 | 1036 | 1001 | 1076 | 932 |
| Energy to Break (In-Lb) | 393 |  | 451 |  | 459 | 412 |
| Vicat (° C.) | 111 | 121 | 118 | 121 | 124 | 122 |
| Heat Distortion | 55.4 | 57.6 | 55.9 | 53.2 | 56.0 | 59.3 |
| Izod Impact RT (ft.lbs./in.) | 11.8 | 11.1 | 9.5 | 10.9 | 11.0 | 9.8 |
| Izod Impact 0 (ft.lbs./in.) | 10.7 | 11.0 | 9.2 | 9.0 | 6.6 | 6.9 |
| Izod Impact −20 (ft.lbs./in.) | 10.5 | 2.0 | 7.7 | 2.0 | 1.8 | 4.1 |
| Izod Impact −40 (ft.lbs./in.) | 1.9 | 1.1 | 1.6 | 1.5 |  | 1.2 |

| Description | Example 27 | Example 28 | Example 29 | Example 30 | Example 31 |
|---|---|---|---|---|---|
| Density | 0.9413 | 0.9408 | 0.9504 | 0.9502 | 0.9499 |
| I2 | 3.70 | 3.63 | 4.27 | 4.30 | 4.15 |
| I10/I2 | 6.90 | 6.87 | 7.27 | 7.29 | 7.49 |
| 1% Sec Modulus(psi) | 101365 |  | 135968 | 121543 | 117812 |
| 2% Sec Modulus (psi) | 84446 | 99865 | 112473 | 100691 | 97297 |
| Flex Modulus (psi) | 124659 | 131207 | 162608 | 151304 | 147838 |
| Yield (psi) | 2591 | 2775 | 3244 | 3262 | 3113 |
| Ultimate (psi) | 4364 | 3886 | 3604 | 3823 | 3849 |
| % Elongation | 1233 | 977 | 1227 | 1124 | 1162 |
| Energy to Break (In-Lb) | 555 |  | 524 | 480 | 509 |

TABLE 10-continued

| | | | | | |
|---|---|---|---|---|---|
| Vicat (° C.) | 123 | 121 | 123 | 128 | 128 |
| Heat Distortion | 56.2 | 58.4 | 61.1 | 66.9 | 64.6 |
| Izod Impact RT (ft.lbs./in.) | 9.8 | 9.5 | 10.5 | 8.9 | 3.8 |
| Izod Impact 0 (ft.lbs./in.) | 2.5 | 2.5 | 6.1 | 2.5 | 1.3 |
| Izod Impact −20 (ft.lbs./in.) | 1.5 | 1.8 | 1.4 | 1.3 | 1.2 |
| Izod Impact −40 (ft.lbs./in.) | | 1.7 | | | |

TABLE 11

| Description | Comparative E | Comparative F | Comparative G | Comparative H | Comparative I | Comparative J |
|---|---|---|---|---|---|---|
| Resin A | PL 1840 | FM 1570 | DPL 1842.00 | FM 1570 | Dowlex 2045 | Dowlex 2045 |
| Wt % A | 0.1500 | 0.1500 | 0.2399 | 0.3118 | 0.3390 | 0.3390 |
| Density A | 0.909 | 0.915 | 0.909 | 0.915 | 0.92 | 0.92 |
| I2 A | 1.0 | 1.0 | 1.0 | 1.0 | 1.0 | 1.0 |
| Volume Fraction A | 0.1543 | 0.1533 | 0.2471 | 0.3198 | 0.3455 | 0.3467 |
| Resin B | Dowlex 2429C | Dowlex 2429C | Dowlex 2038 | Dowlex 2038 | NG 2432N | NG 2429N |
| Wt % B | 0.2490 | 0.3019 | 0.0992 | 0.0272 | 0.0885 | 0.0677 |
| Density B | 0.935 | 0.935 | 0.935 | 0.935 | 0.939 | 0.935 |
| I2 B | 4.0 | 4.0 | 1.0 | 1.0 | 4.0 | 4.0 |
| Resin C | Dowlex 2431C | Dowlex 2431C | HDPE 04452N | HDPE 04452N | HDPE 04452N | HDPE 04452N |
| Wt % C | 0.3716 | 0.3716 | 0.6610 | 0.6610 | 0.5724 | 0.5933 |
| Density C | 0.935 | 0.935 | 0.952 | 0.952 | 0.952 | 0.952 |
| I2 C | 7.0 | 7.0 | 4.0 | 4.0 | 4.0 | 4.0 |
| Resin D | HDPE 04452N | HDPE 04452N | | | | |
| Wt % D | 0.2294 | 0.1765 | | | | |
| Density D | 0.952 | 0.952 | | | | |
| I2 D | 4.0 | 4.0 | | | | |
| Final Density | 0.9352 | 0.9349 | 0.9365 | 0.9384 | 0.9375 | 0.9408 |
| Final I2 | 4.03 | 4.02 | 2.62 | 2.59 | 2.15 | 2.58 |
| Final I10/I2 | 7.4 | 7.4 | 7.3 | 7.6 | 7.5 | 6.9 |

| Description | Comparative K | Comparative L | Comparative M | Comparative N | Comparative O | Comparative P |
|---|---|---|---|---|---|---|
| Resin A | DPL 1842.00 | FM 1570 | Dowlex 2045 | DPL 1842.00 | FM 1570 | DPL 1842.00 |
| Wt % A | 0.2075 | 0.2075 | 0.2075 | 0.1498 | 0.1498 | 0.0963 |
| Density A | 0.909 | 0.915 | 0.92 | 0.909 | 0.915 | 0.909 |
| I2 A | 1.0 | 1.0 | 1.0 | 1.0 | 1.0 | 1.0 |
| Volume Fraction A | 0.2149 | 0.2133 | 0.2122 | 0.1551 | 0.1541 | 0.0993 |
| Resin B | Dowlex 2027A | Dowlex 2027A | NG 2429N | Dowlex 2027A | Dowlex 2027A | Dowlex 2027A |
| Wt % B | 0.2797 | 0.3929 | 0.3153 | 0.5054 | 0.5871 | 0.7144 |
| Density B | 0.941 | 0.941 | 0.935 | 0.941 | 0.941 | 0.941 |
| I2 B | 4.0 | 4.0 | 4.0 | 4.0 | 4.0 | 4.0 |
| Resin C | HDPE 04452N | HDPE 04452N | HDPE 04452N | HDPE 04452N | HDPE 04452N | HDPE 04452N |
| Wt % C | 0.5128 | 0.3996 | 0.4772 | 0.3448 | 0.2631 | 0.1893 |
| Density C | 0.952 | 0.952 | 0.952 | 0.952 | 0.952 | 0.952 |
| I2 C | 4.0 | 4.0 | 4.0 | 4.0 | 4.0 | 4.0 |
| Final Density | 0.9415 | 0.9406 | 0.9408 | 0.9412 | 0.9415 | 0.9410 |
| Final I2 | 3.04 | 3.09 | 2.97 | 3.39 | 3.38 | 3.60 |
| Final I10/I2 | 7.2 | 7.2 | 7.1 | 7.1 | 7.0 | 6.8 |

| Description | Comparative Q | Comparative R | Comparative S | Comparative T |
|---|---|---|---|---|
| Resin A | FM 1570 | Dowlex 2045 | PL 1840 | FM 1570 |
| Wt % A | 0.0963 | 0.2075 | 0.1192 | 0.1192 |
| Density A | 0.915 | 0.92 | 0.909 | 0.915 |
| I2 A | 1.0 | 1.0 | 1.0 | 1.0 |
| Volume Fraction A | 0.0991 | 0.2119 | 0.1247 | 0.1238 |
| Resin B | Dowlex 2027A | NG 2431N | HDPE 04452N | HDPE 04452N |
| Wt % B | 0.7669 | 0.4123 | 0.4286 | 0.4729 |
| Density B | 0.941 | 0.935 | 0.952 | 0.952 |
| I2 B | 4.0 | 7.0 | 4.0 | 4.0 |
| Resin C | HDPE 04452N | HDPE 04452N | HDPE 08454N | HDPE 08454N |
| Wt % C | 0.1368 | 0.3802 | 0.1911 | 0.2205 |
| Density C | 0.952 | 0.952 | 0.954 | 0.954 |
| I2 C | 4.0 | 4.0 | 7.0 | 7.0 |
| Resin D | | | HDPE 05862N | HDPE 05862N |
| Wt % D | | | 0.2611 | 0.1875 |
| Density D | | | 0.9625 | 0.9625 |
| I2 D | | | 5.0 | 5.0 |
| Final Density | 0.9410 | 0.9394 | 0.9509 | 0.9506 |
| Final I2 | 3.63 | 3.73 | 3.70 | 4.47 |
| Final I10/I2 | 7.0 | 7.1 | 8.3 | 7.3 |

TABLE 12

| Description | Comparative E | Comparative F | Comparative G | Comparative H | Comparative I | Comparative J |
|---|---|---|---|---|---|---|
| Density | 0.9352 | 0.9349 | 0.9365 | 0.9384 | 0.9375 | 0.9408 |
| I2 | 4.03 | 4.02 | 2.62 | 2.59 | 2.15 | 2.58 |
| I10/I2 | 7.42 | 7.41 | 7.34 | 7.57 | 7.54 | 6.94 |
| 1% Sec Modulus (psi) | 72971 | 76995 | | | | |
| 2% Sec Modulus (psi) | 61335 | 64186 | 81563 | 88222 | 82578 | 95217 |
| Flex Modulus (psi) | 92740 | 100596 | 103989 | 114934 | 106039 | 125597 |
| Yield (psi) | 2312 | 2300 | 2481 | 2548 | 2410 | 2800 |
| Ultimate (psi) | 3770 | 3723 | 4414 | 4068 | 4311 | 4356 |
| % Elongation | 966 | 1119 | 987 | 994 | 1000 | 998 |
| Energy to Break (In-Lb) | 376 | 447 | | | | |
| Vicat (° C.) | 116 | 117 | 118 | 118 | 117 | 121 |
| Heat Distortion | 51.5 | 49.9 | 52.1 | 53.8 | 52.4 | 56.7 |
| Izod Impact RT (ft.lbs./in.) | 8.7 | 6.4 | 11.6 | 10.2 | 11.6 | 9.2 |
| Izod Impact 0 (ft.lbs./in.) | 2.1 | 1.5 | 3.8 | 3.5 | 4.8 | 2.7 |
| Izod Impact −20 (ft.lbs./in.) | 1.4 | 1.3 | 1.7 | 1.8 | 1.8 | 1.6 |
| Izod Impact −40 (ft.lbs./in.) | | | 1.6 | 1.6 | 1.5 | 1.6 |

| Description | Comparative K | Comparative L | Comparative M | Comparative N | Comparative O | Comparative P |
|---|---|---|---|---|---|---|
| Density | 0.9415 | 0.9406 | 0.9408 | 0.9412 | 0.9415 | 0.9410 |
| I2 | 3.04 | 3.09 | 2.97 | 3.39 | 3.38 | 3.60 |
| I10/I2 | 7.23 | 7.23 | 7.14 | 7.06 | 7.02 | 6.77 |
| 1% Sec Modulus (psi) | | | | | | |
| 2% Sec Modulus (psi) | 98803 | 98230 | 96379 | 108823 | 99322 | 101133 |
| Flex Modulus (psi) | 126879 | 130327 | 125865 | 149601 | 133536 | 136044 |
| Yield (psi) | 2827 | 2802 | 2758 | 2832 | 2784 | 2733 |
| Ultimate (psi) | 4164 | 4130 | 4190 | 4098 | 4022 | 4123 |
| % Elongation | 999 | 996 | 999 | 1001 | 1000 | 1008 |
| Energy to Break (In-Lb) | | | | | | |
| Vicat (° C.) | 120 | 120 | 120 | 121 | 121 | 121 |
| Heat Distortion | 55.6 | 55.1 | 56.4 | 56.6 | 59.4 | 55.5 |
| Izod Impact RT (ft.lbs./in.) | 8.9 | 8.2 | 7.1 | 5.5 | 5.4 | 3.9 |
| Izod Impact 0 (ft.lbs./in.) | 2.7 | 2.2 | 2.1 | 1.9 | 1.8 | 2.1 |
| Izod Impact −20 (ft.lbs./in.) | 1.8 | 1.7 | 1.6 | 1.7 | 1.7 | 1.7 |
| Izod Impact −40 (ft.lbs./in.) | 1.4 | 1.6 | 1.5 | 1.7 | 1.7 | 1.6 |

| Description | Comparative Q | Comparative R | Comparative S | Comparative T |
|---|---|---|---|---|
| Density | 0.9410 | 0.9394 | 0.9509 | 0.9506 |
| I2 | 3.63 | 3.73 | 3.70 | 4.47 |
| I10/I2 | 6.97 | 7.12 | 8.25 | 7.34 |
| 1% Sec Modulus (psi) | | | 117446 | 127849 |
| 2% Sec Modulus (psi) | 93929 | 91831 | 96957 | 105429 |
| Flex Modulus (psi) | 123224 | 120391 | 152326 | 161894 |
| Yield (psi) | 2745 | 2617 | 3462 | 3374 |
| Ultimate (psi) | 3894 | 4109 | 3879 | 3912 |
| % Elongation | 1004 | 999 | 1214 | 1351 |
| Energy to Break (In-Lb) | | | 511 | 574 |
| Vicat (° C.) | 121 | 119 | 128 | 128 |
| Heat Distortion | 60.2 | 56.1 | 68.0 | 67.6 |
| Izod Impact RT (ft.lbs./in.) | 3.5 | 3.9 | 1.8 | 1.4 |
| Izod Impact 0 (ft.lbs./in.) | 2.0 | 1.8 | 1.2 | 1.2 |
| Izod Impact −20 (ft.lbs./in.) | 1.6 | 1.5 | 1.2 | 1.1 |
| Izod Impact −40 (ft.lbs./in.) | 1.7 | 1.5 | | |

The data in Tables 9–12 and FIG. 1 demonstrate the surprising step change increase in Izod impact, measured at either 23° C., 0° C. or −20° C., when the density of Component A is less than 0.909 g/cm$^3$.

We claim:

1. A molded article comprising an ethylene/α-olefin interpolymer composition wherein said interpolymer composition has a density of from about 0.940 to about 0.960 and a melt index, I2, of from about 3 to about 100 g/10 min; and comprises (A) an interpolymer of ethylene with at least one $C_{3-8}$ α-olefin and present in an amount of from about 5 to about 50% by weight, based on the combined weight of Components A and B, and having
  (i) a narrow molecular weight distribution, defined as an $M_w/M_n$ of less than about 3,
  (ii) a narrow composition distribution breadth index, CDBI, defined as the weight percent of the polymer molecules having a comonomer content within 50 percent of the median total molar comonomer content of Component A, which is greater than about 50 percent;
  (iii) a degree of branching less than or equal to 2 methyls/1000 carbons in about 15 percent or less by weight, based on the total weight of Component A;
  (iv) an aluminum residue content of less than or equal to about 250 ppm present in the interpolymer composition, and
  (v) a density of from about 0.850 to about 0.908 g/cm3; and (B) one or more homopolymers or interpolymers of ethylene and/or at least one $C_{3-8}$ α-olefin and is present in an amount of from about 50 to about 95% by weight, based on the combined weight of Components A and B, and (i) has a broad molecular weight distribution, define as an $M_w/M_n$ of greater than about 3,
(ii) has a broad composition distribution with a degree of branching less than or equal to 2 methyls/1000 carbons in about 10 percent or more by weight, based on the total weight of Component B, and
(iii) has a degree of branching greater than or equal to 25 methyls/1000 carbons in about 25 percent or less by weight, based on the total weight of Component B, and wherein
(a) said interpolymer composition has an improvement in 23° C. Izod Impact of at least 5% over a blend of Component A and Component B having the same final melt index and density, but wherein the density of Component A is greater than or equal to 0.909 g/cm³ and
(b) said molded article is made by rotational molding, injection molding or blow molding.

2. The molded article of claim 1 wherein said interpolymer composition has a density of from about 0.940 to about 0.955 and a melt index, I12, of from about 3 to about 50 g/10 min; and wherein
(A) Component A is an interpolymer of ethylene with at least one $C_{3-8}$ α-olefin and present in an amount of from about 7 to about 50% by weight, based on the combined weight of Components A and B, and has a density of from about 0.850 to about 0.906 g/cm3; and
(B) Component B is one or more homopolymers or interpolymers of ethylene and/or at least one $C_{3-8}$ α-olefin and is present in an amount of from about 50 to about 93% by weight, based on the combined weight of Components A and B; and wherein
said interpolymer composition has an improvement in 23° C. Izod Impact of at least 7% over a blend of Component A and Component B having the same final melt index and density; but wherein the density of Component A is greater than or equal to 0.909 g/cm³.

3. The molded article of claim 2 wherein said interpolymer composition has a density of from about 0.940 to about 0.950 and a melt index, I12, of from about 3 to about 25 g/10 min; and wherein
(A) Component A is an interpolymer of ethylene with at least one $C_{3-8}$ α-olefin and present in an amount of from about 10 to about 50% by weight, based on the combined weight of Components A and B, and has a density of from about 0.850 to about 0.903 g/cm3; and
(B) Component B is one or more homopolymers or interpolymers of ethylene and/or at least one $C_{3-8}$ α-olefin and is present in an amount of from about 50 to about 90% by weight, based on the combined weight of Components A and B; and wherein
said interpolymer composition has an improvement in 23° C. Izod Impact of at least 10% over a blend of Component A and Component B having the same final melt index and density, but wherein the density of Component A is greater than or equal to 0.909 g/cm³.

4. The molded article of claim 1 wherein said interpolymer composition has a density of from about 0.930 to about 0.965 and a melt index, I12, of from about 0.5 to about 4 g/10 min; and wherein
(A) Component A is an interpolymer of ethylene with at least one $C_{3-8}$ α-olefin and present in an amount of from about 10 to about 50% by weights based on the combined weight of Components A and B, and has a density of from about 0.850 to about 0.903 g/cm3; and
(B) Component B is one or more homopolymers or interpolymers of ethylene and/or at least one $C_{3-8}$ α-olefin and is present in an amount of from about 50 to about 90% by weight, based on the combined weight of Components A and B; and wherein
said interpolymer composition has an improvement in 0° C. Izod Impact of at least 5% over a blend of Component A and Component B having the same final melt index and density, but wherein the density of Component A is greater than or equal to 0.909 g/cm³.

5. The molded article of claim 1 wherein said interpolymer composition has a density of from about 0.935 to about 0.945 and a melt index, I12, of from about 0.5 to about 3.3 g/10 min; and wherein
(A) Component A is an interpolymer of ethylene with at least one $C_{3-8}$ α-olefin and present in an amount of from about 15 to about 50% by weight, based on the combined weight of Components A and B, and has a density of from about 0.850 to about 0.890 g/cm3; and
(B) Component B is one or more homopolymers or interpolymers of ethylene and/or at least one $C_{3-8}$ α-olefin and is present in an amount of from about 50 to about 85% by weight based on the combined weight of Components A and B; and wherein
said interpolymer composition has an improvement in −20° C. Izod Impact of at least 5% over a blend of Component A and Component B having the same final melt index and density, but wherein the density of Component A is greater than or equal to 0.909 g/cm³.

6. An interpolymer blend composition having a density of from about 0.940 to about 0.960 and a melt index (I2) of from about 3 to about 100 g/10 min; comprising
(A) one or more ethylene/α-olefin interpolymers which;
(i) has a narrow molecular weight distribution, defined as an $M_w/M_n$ of less than about 3,
(ii) has a narrow composition distribution breadth index, CDBI, defined as the weight percent of the polymer molecules having a comonomer content within 50 percent of the median total molar comonomer content of Component A, which is greater than about 50 percent;
(iii) has a degree of branching less than or equal to 2 methyls/1000 carbons in about 15 percent or less by weight, based on the total weight of Component A;
(iv) has an aluminum residue content of less than or equal to about 250 ppm present in the interpolymer composition, and
(v) is present in an amount of from about from about 5 to about 50% by weight, based on the combined weight of Components A and B; and
(vi) has a density of from about 0.850 to about 0.908 g/cm3; and
(B) an ethylene/α-olefin interpolymer; which
(i) has a broad molecular weight distribution, defined as defined as an $M_w/M_n$ of greater than about 3,
(ii) has a broad composition distribution with a degree of branching less than or equal to 2 methyls/1000 carbons in about 10 percent or more by weight, based on the total weight of Component B,;
(iii) has a degree of branching greater than or equal to 25 methyls/1000 carbons in about 25 percent or less by weight, based on the total weight of Component B; and
(iv) is present in an amount of from about 50 to about 95% by weight, based on the combined weight of Components A and B,; and wherein
(C) said interpolymer composition has an improvement in 23° C. Izod Impact of at least 5% over a blend of Component A and Component B having the same final melt index and density, but wherein the density of Component A is greater than or equal to 0.909 g/cm³.

7. The interpolymer composition of claim 6 having a density of from about 0.940 to about 0.955 and a melt index (I2) of from about 3 to about 50 g/10 min; and wherein (A) Component A is an interpolymer of ethylene with at least one $C_{3-8}$ α-olefin and present in an amount of from about 7 to about 50% by weight, based on the combined weight of Components A and B, and has a density of from about 0.850 to about 0.906 g/cm3; and (B) Component B is one or more homopolymers or interpolymers of ethylene and/or at least one $C_{3-8}$ α-olefin and is present in an amount of from about 50 to about 93% by weight( based on the combined weight of Components A and B; and wherein said interpolymer composition has an improvement in 23° C. Izod Impact of at least 7% over a blend of Component A and Component B having the same final melt index and density, but wherein the density of Component A is greater than or equal to 0.909 g/cm³.

8. The interpolymer composition of claim 6 having a density of from about 0.940 to about 0.950 and a melt index (I2) of from about 3 to about 25 g/10 min; and wherein (A) Component A is an interpolymer of ethylene with at least one $C_{3-8}$ α-olefin and present in an amount of from about 10 to about 50% by weight (based on the combined weight of Components A and B and has a density of from about 0.850 to about 0.903 g/cm3; and (B) Component B is one or more homopolymers or interpolymers of ethylene and/or at least one $C_{3-8}$ α-olefin and is present in an amount of from about 50 to about 90% by weight based on the combined weight of Components A and B; and wherein said interpolymer composition has an improvement in 23° C. Izod Impact of at least 7% over a blend of "Component A and Component B having". the same final melt index and density, but wherein the density of Component A is greater than or equal to 0.909 g/cm³.

* * * * *